US010754719B2

(12) United States Patent
Isoyama et al.

(10) Patent No.: US 10,754,719 B2
(45) Date of Patent: Aug. 25, 2020

(54) DIAGNOSIS DEVICE, DIAGNOSIS METHOD, AND NON-VOLATILE RECORDING MEDIUM

(71) Applicant: NEC Corporation, Minato-ku, Tokyo (JP)

(72) Inventors: Kazuhiko Isoyama, Tokyo (JP); Koji Kida, Tokyo (JP); Hiroki Tagato, Tokyo (JP); Yoshiaki Sakae, Tokyo (JP); Junpei Kamimura, Tokyo (JP); Yuji Kobayashi, Tokyo (JP); Etsuko Ichihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 170 days.

(21) Appl. No.: 15/781,527

(22) PCT Filed: Dec. 6, 2016

(86) PCT No.: PCT/JP2016/086196
§ 371 (c)(1),
(2) Date: Jun. 5, 2018

(87) PCT Pub. No.: WO2017/099062
PCT Pub. Date: Jun. 15, 2017

(65) Prior Publication Data
US 2018/0276064 A1    Sep. 27, 2018

(30) Foreign Application Priority Data

Dec. 9, 2015 (JP) ................. 2015-239829

(51) Int. Cl.
*G06F 11/00* (2006.01)
*G06F 11/07* (2006.01)
*G06F 21/57* (2013.01)

(52) U.S. Cl.
CPC ........ *G06F 11/079* (2013.01); *G06F 11/0709* (2013.01); *G06F 11/0751* (2013.01); *G06F 11/0754* (2013.01); *G06F 21/577* (2013.01)

(58) Field of Classification Search
CPC ............... G06F 11/079; G06F 11/0751; G06F 11/0709; G06F 11/0754; G06F 11/3452;
(Continued)

(56) References Cited

U.S. PATENT DOCUMENTS

2005/0091513 A1  4/2005  Mitomo et al.
2013/0274899 A1  10/2013  Hamzaoui et al.
(Continued)

FOREIGN PATENT DOCUMENTS

JP    2005-136526 A    5/2005
JP    2012-84994 A     4/2012
(Continued)

OTHER PUBLICATIONS

International Search Report for PCT Application No. PCT/JP2016/086196, dated Jan. 10, 2017.
(Continued)

*Primary Examiner* — Charles Ehne

(57) ABSTRACT

The diagnosis device specifies a progression degree relating to a first information processing device for output information output by a first detection device at a first timing with respect to the first information processing device, based on device information indicates a progression degree that represents a degree to which the information processing device is abnormal with respect to the information processing device, determines whether or not information in which a first detection device identifier of the first detection device and the specified progression degree are associated with each other is included in progression-degree information in which a detection device identifier capable of identifying a detection device and the progression degree are associated with each other; and calculates the progression degree relating to the first information processing device according to the specified progression degree when the information is
(Continued)

determined to be included in the progression-degree information.

9 Claims, 20 Drawing Sheets

(58) Field of Classification Search
CPC .... G06F 11/076; G06F 11/34; G06F 11/3466; G06F 11/0766
See application file for complete search history.

(56) References Cited

U.S. PATENT DOCUMENTS

| | | | | |
|---|---|---|---|---|
| 2014/0095921 | A1* | 4/2014 | Kobayashi | G06F 11/1441 714/2 |
| 2014/0195868 | A1* | 7/2014 | Hasegawa | G06F 11/076 714/724 |
| 2015/0026521 | A1* | 1/2015 | Yabuki | G06F 11/079 714/37 |
| 2015/0205956 | A1 | 7/2015 | Sakurai et al. | |
| 2015/0249676 | A1 | 9/2015 | Koyanagi et al. | |

FOREIGN PATENT DOCUMENTS

| | | |
|---|---|---|
| JP | 2015-164244 A | 9/2015 |
| WO | 2009/075128 A1 | 6/2009 |
| WO | 2012/090718 A1 | 7/2012 |
| WO | 2014/045827 A1 | 3/2014 |

OTHER PUBLICATIONS

English translation of Written opinion for PCT Application No. PCT/JP2016/086196.

* cited by examiner

HISTORY INFORMATION STORAGE UNIT

| DETECTION DEVICE ID | TIMING | OUTPUT INFORMATION |
|---|---|---|
| D1 | T1 | M1 PERFORMED PORT SCAN |
| D2 | T2 | NUMBER OF CONNECTIONS BY PROCESS P3 IN M2 INCREASED |
| D3 | T2 | USER U1 OF M1 STARTED PROCESS P5 |
| D4 | T5 | PROCESS P1 IN M1 ACCESSED FIVE FILES |
| D1 | T4 | M3 PERFORMED PORT SCAN |
| ... | ... | ... |

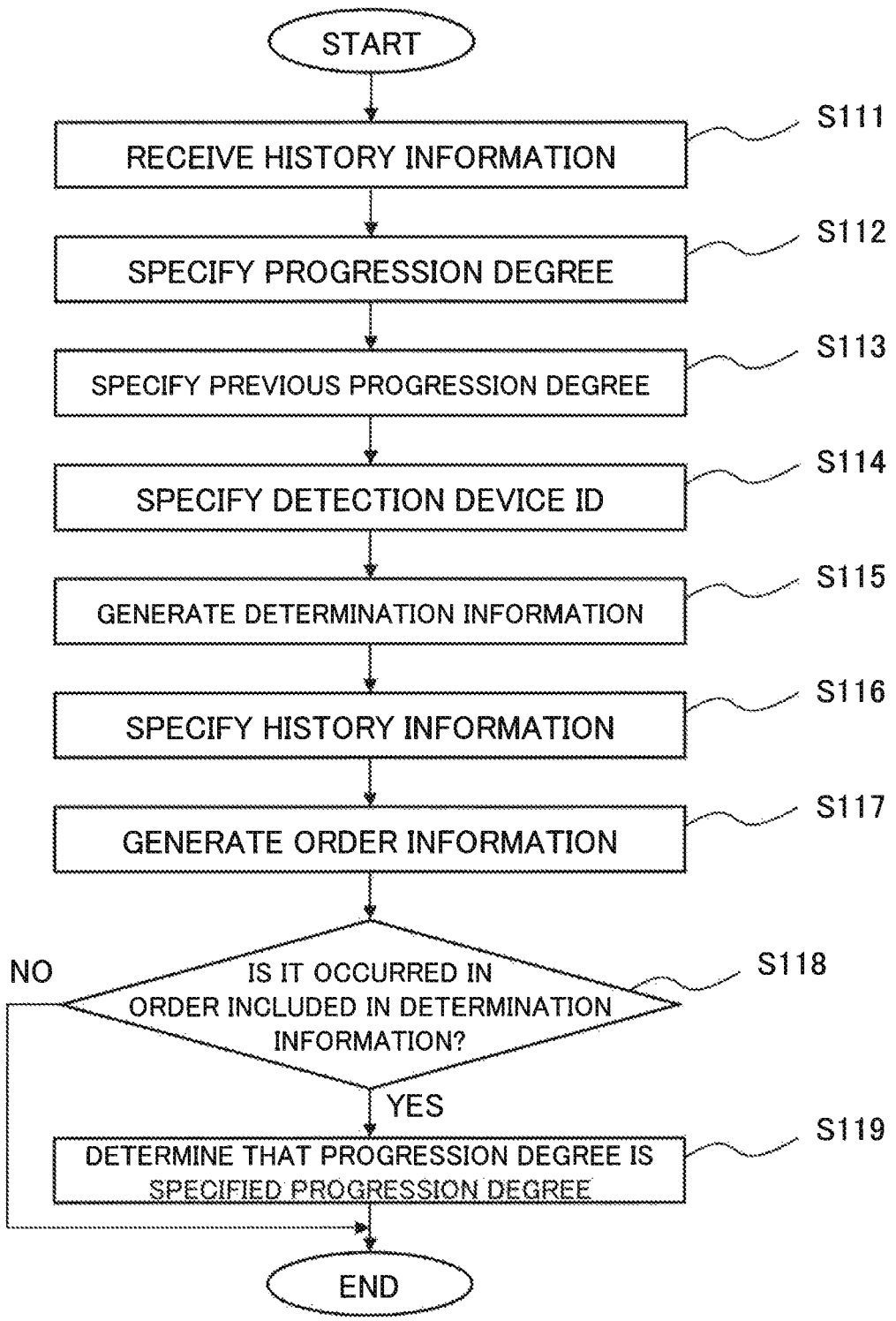

Fig.8

| DETECTION DEVICE NAME | PROGRESSION DEGREE | | | | | | | | | |
|---|---|---|---|---|---|---|---|---|---|---|
| | NETWORK SEARCH ACTIVITY | C&C COMMUNICATION | LATERAL MOVEMENT | GENERATION OF NEW USER AND ELEVATION OF ITS PRIVILEGE | SEARCH OF IMPORTANT FILE | ALTERATION OF PROGRAM, DLL, CONFIGURATION FILE, LOG, ETC. | EXECUTION OF INFECTED PROGRAM | ACCESS TO AND DESTRUCTION OF IMPORTANT FILE | TAKEOUT OF IMPORTANT FILE |
| FIRST | ○ | | | | | | | | ○ |
| SECOND | ○ | | | | | | | | ○ |
| THIRD | ○ | | ○ | | | | | | |
| FOURTH | | ○ | | | | | | | |
| FIFTH | | | | | | ○ | ○ | | |
| SIXTH | | | | | ○ | | ○ | | |
| SEVENTH | | | | | | | ○ | | |
| EIGHTH | | | | | | | | ○ | |
| NINTH | | | | ○ | | | | ○ | |
| TENTH | | | | ○ | | | | | |

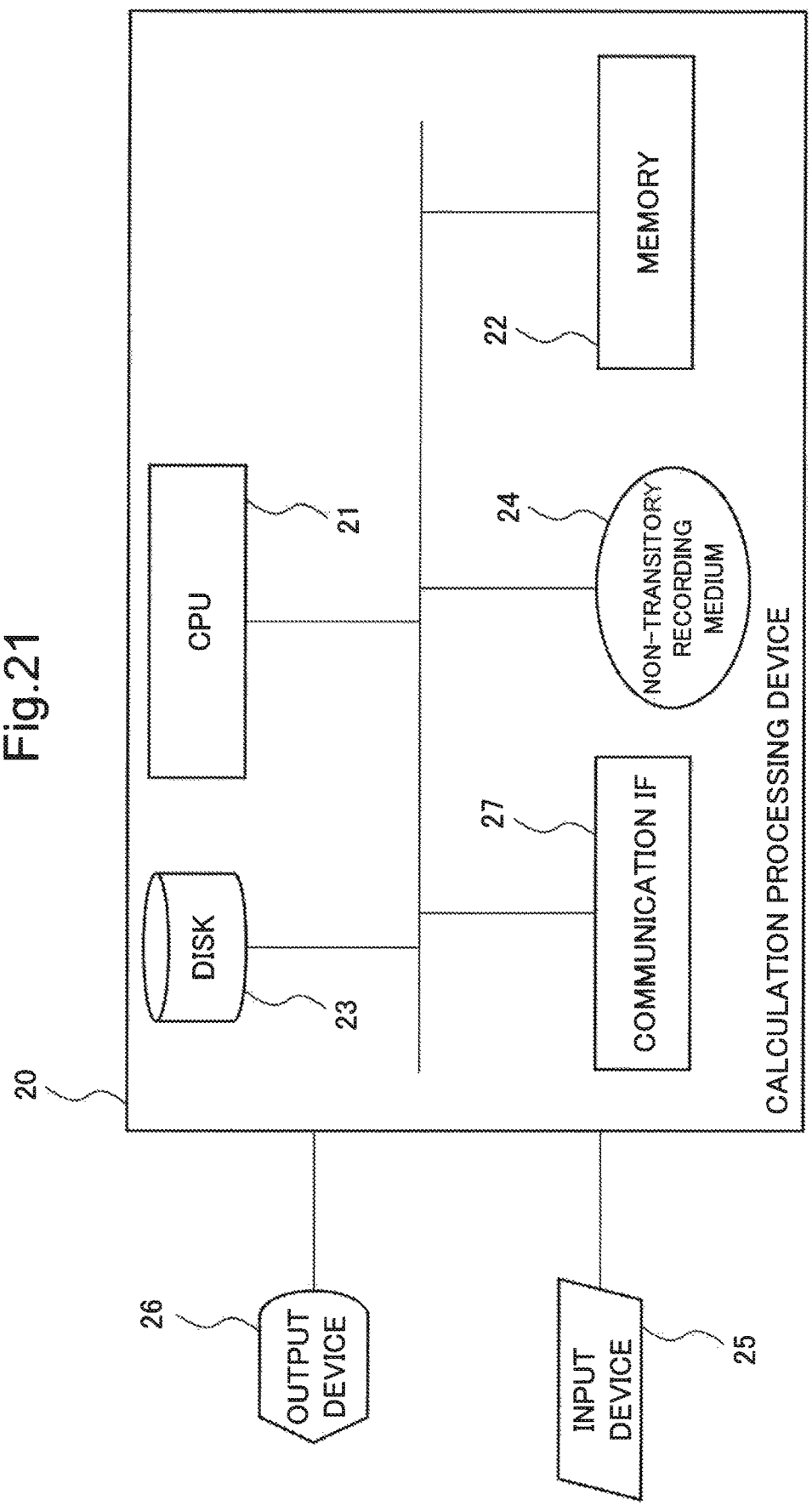

US 10,754,719 B2

DIAGNOSIS DEVICE, DIAGNOSIS METHOD, AND NON-VOLATILE RECORDING MEDIUM

This application is a National Stage Entry of PCT/JP2016/086196 filed on Dec. 6, 2016, which claims priority from Japanese Patent Application 2015-239829 filed on Dec. 9, 2015, the contents of all of which are incorporated herein by reference, in their entirety.

TECHNICAL FIELD

The present invention relates to a diagnosis device and the like that diagnose the degree of an abnormality having occurred in an information processing system.

BACKGROUND ART

Devices disclosed in PTLs 1 to 3 are examples of devices for detecting an abnormality having occurred in an information processing system.

An abnormality detection device disclosed in PTL 1 detects a piece of abnormal information out of a plurality of pieces of information at an information source. The abnormality detection device applies each of a plurality of algorithms to each piece of information, calculates weights of the respective calculated results, aggregates all results based on the weights and, thereby, detects a piece of abnormal information.

A diagnosis device disclosed in PTL 2 receives measurement data that were measured with respect to a plurality of measurement targets in an information processing system, and applies an operation algorithm to the measurement data based on classification information in which the plurality of measurement targets are classified. The diagnosis device calculates an abnormality value relating to the measurement data through the above-described processing. The diagnosis device applies a predetermined determination algorithm to the calculated abnormality value and, thereby, determines whether or not the information processing system is abnormal.

A malware detection device disclosed in PTL 3 specifies a communication different from a predetermined communication out of communications performed between an internal terminal communicably connected to a certain communication network and an external terminal communicably connected to a communication network different from the certain communication network. When the number of times of the specified communications is more than or equal to a predetermined number, the malware detection device detects an internal terminal having performed the communications to be a suspicious terminal. When the number of times of communications performed among a plurality of suspicious terminals exceeds a predetermined number, the malware detection device detects the suspicious terminals to be infected with malware.

CITATION LIST

Patent Literature

PTL 1: International Publication No. WO2009/075128
PTL 2: International Publication No. WO2012/090718
PTL 3: Japanese Unexamined Patent Application Publication No. 2012-84994

Summary of Invention

Technical Problem

Weights calculated by the abnormality detection device disclosed in PTL 1 are values calculated in accordance with a predetermined operation processing and are not always values reflecting transitions between causes producing an abnormality. As a result, the abnormality detection device has a difficulty of accurately detecting an abnormality having occurred in an information processing device.

An abnormality value calculated by the diagnosis device disclosed in PTL 2 is a value calculated based on classification information in which measurement targets are classified and is not always a value reflecting transitions between causes producing the abnormality. As a result, the diagnosis device has a difficulty of accurately detecting an abnormality having occurred in an information processing device.

Since determination processing in the malware detection device disclosed in PTL 3 is performed based on the number of times that internal terminals and external terminals communicated with each other and the number of times that suspicious terminals communicate with each other, the malware detection device cannot detect a suspicious terminal when an abnormality occurs in relation to a value other than the numbers of times.

Therefore, even when any of the devices disclosed in PTLs 1 to 3 is used, it is difficult to detect an abnormality having occurred in an information processing system accurately.

Accordingly, one object of the present invention is to provide a diagnosis device and the like capable of accurately detecting a degree of an abnormality having occurred in an information processing system.

Solution to Problem

In order to achieve the above-described object, as an aspect of the present invention, a diagnosis device including:

progression-degree specifying means for specifying a progression degree relating to a first information processing device for output information output by a first detection device at a first timing with respect to the first information processing device, based on device information indicates a progression degree that represents a degree to which the information processing device is abnormal with respect to the information processing device;

progression-degree determining means for determining whether or not information in which a first detection device identifier of the first detection device and the progression degree specified by the progression-degree specifying means are associated with each other is included in progression-degree information in which a detection device identifier capable of identifying a detection device and the progression degree are associated with each other; and progression-degree updating means for calculating the progression degree relating to the first information processing device according to the specified progression degree when the information is determined to be included in the progression-degree information.

In addition, as another aspect of the present invention, a diagnosis method, including:

specifying a progression degree relating to a first information processing device for output information output by a first detection device at a first timing with respect to the first information processing device, based on device information indicates a progression degree that represents a degree to which the information processing device is abnormal with respect to the information processing device;

determining whether or not information in which a first detection device identifier of the first detection device and the specified progression degree are associated with each other is included in progression-degree information in which a detection device identifier capable of identifying a detection device and the progression degree are associated with each other; and calculating the progression degree relating to the first information processing device according to the specified progression degree when the information is determined to be included in the progression-degree information.

In addition, as another aspect of the present invention, a diagnosis program including:

a progression-degree specifying function for specifying a progression degree relating to a first information processing device for output information output by a first detection device at a first timing with respect to the first information processing device, based on device information indicates a progression degree that represents a degree to which the information processing device is abnormal with respect to the information processing device;

a progression-degree determining function for determining whether or not information in which a first detection device identifier of the first detection device and the progression degree specified by the progression-degree specifying function are associated with each other is included in progression-degree information in which a detection device identifier capable of identifying a detection device and the progression degree are associated with each other; and a progression-degree updating function for calculating the progression degree relating to the first information processing device according to the specified progression degree when the information is determined to be included in the progression-degree information.

Furthermore, the object is also realized by a computer-readable recording medium, which records the diagnosis program includes Advantageous Effects of Invention A diagnosis device and the like according to the present invention can accurately detect a degree of an abnormality having occurred in an information processing system.

BRIEF DESCRIPTION OF DRAWINGS

FIG. 7 is a flowchart illustrating a processing flow in the diagnosis device according to the second example embodiment.

FIG. 8 is a diagram conceptually illustrating an example of progression-degree information.

FIG. 21 is a block diagram schematically illustrating a hardware configuration of a calculation processing device capable of realizing the diagnosis device according to the each example embodiments of the present invention.

DESCRIPTION OF EMBODIMENTS

Next, example embodiments embodying the present invention will be described in detail with reference to the drawings.

First Example Embodiment

Figure 1:
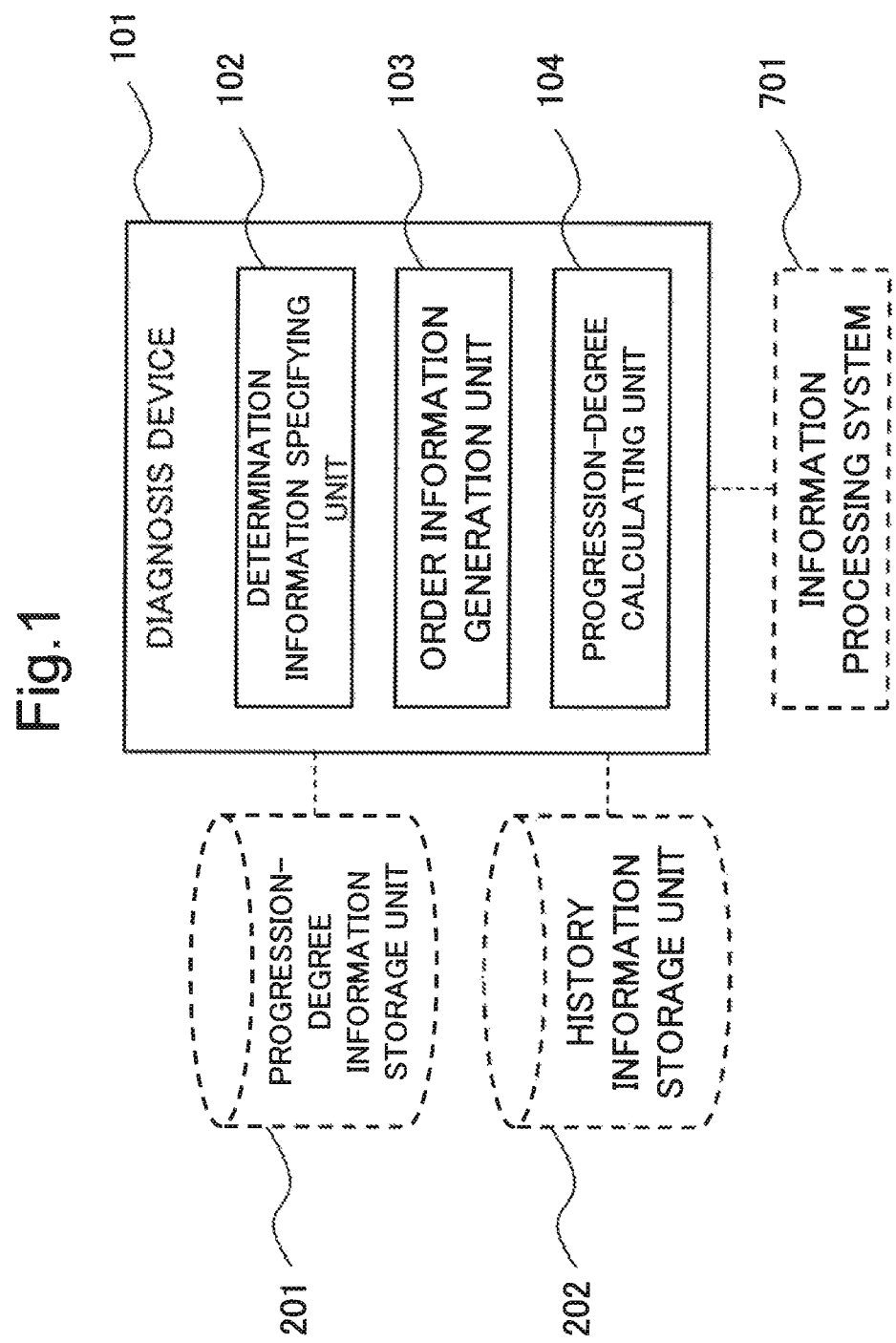
FIG. 1 is a block diagram illustrating a configuration of a diagnosis device according to a first example embodiment of the present invention.

With reference to FIG. 1, a configuration of diagnosis device 101 according to a first example embodiment of the present invention will be described in detail. FIG. 1 is a block diagram illustrating the configuration of the diagnosis device 101 according to the first example embodiment of the present invention.

The diagnosis device 101 according to the first example embodiment includes a determination information specifying unit (determination information specifier) 102, an order information generation unit (order information generator) 103, and a progression-degree calculating unit (progression-degree calculator) 104.

The diagnosis device 101 calculates a progression degree that represents a degree to which an abnormality caused by processing (for example, an attack) performed against an information processing device in an information processing system 701 (details will be described later with reference to FIG. 2) has progressed. For example, such processing is performed by software, such as malware, executed with malicious intent (or an attacker and the like). Hereinafter, an "attack" represents processing performed by software, such as malware, executed with malicious intent (or an attacker and the like).

The diagnosis device 101 calculates a progression degree relating to an information processing device, based on progression-degree information (details will be described later with reference to FIG. 5) stored in a progression-degree information storage unit 201 and history information (details will be described later with reference to FIG. 4) stored in a history information storage unit 202. The progression-degree information does not always have to be stored in the progression-degree information storage unit 201 and may, for example, be received from an external device (not illustrated) or the like. The history information also does not always have to be stored in the history information storage unit 202 and may, for example, be received from an external device (not illustrated) or the like.

Figure 2:
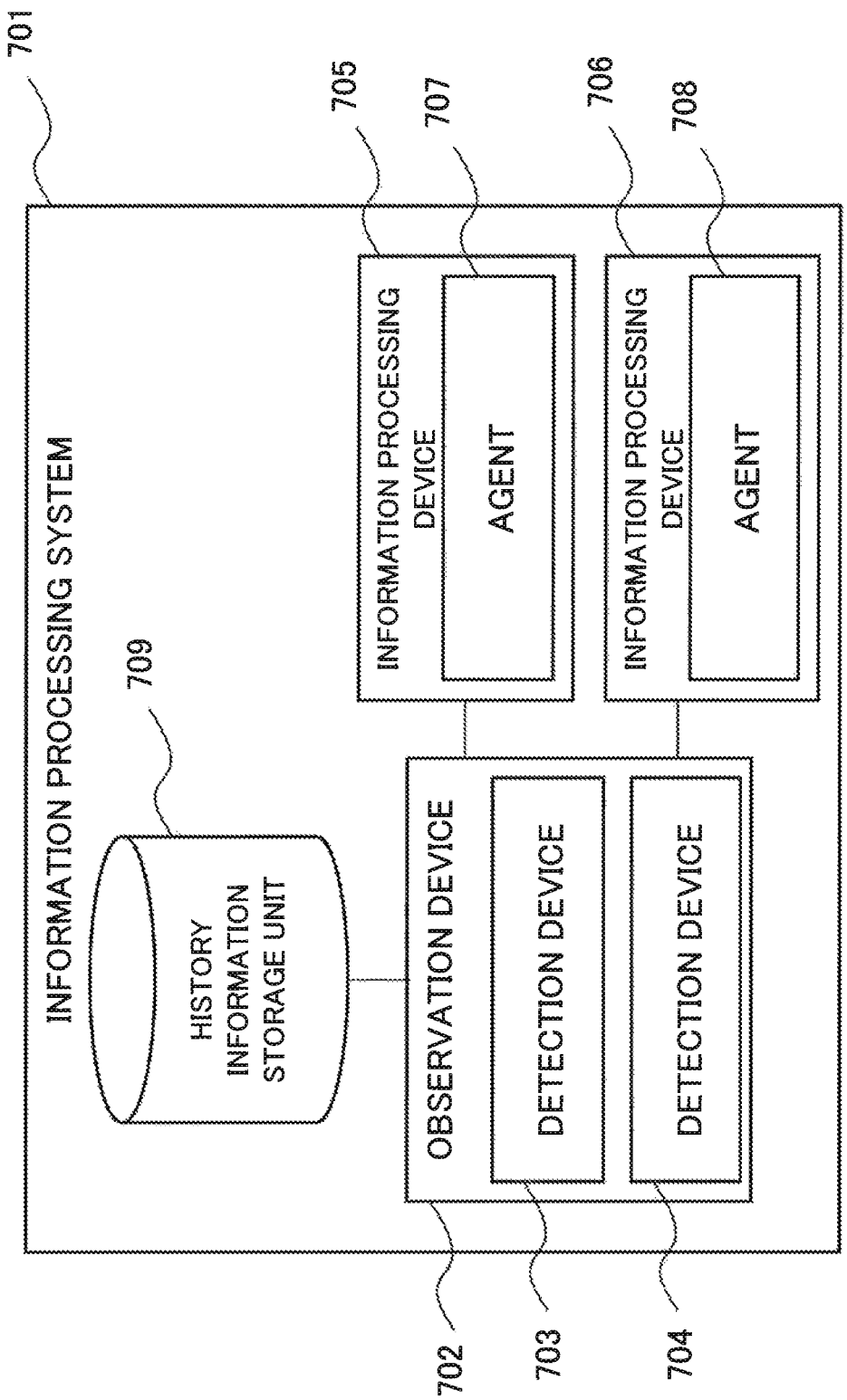
FIG. 2 is a block diagram illustrating a configuration of an information processing system.

Next, with reference to FIG. 2, a configuration of the information processing system 701 will be described in detail. FIG. 2 is a block diagram illustrating a configuration of the information processing system 701.

The information processing system 701 includes an observation device 702, a history information storage unit 709, and one or more information processing devices (in the case of FIG. 2, an information processing device 705 and an information processing device 706). The observation device 702 includes one or more detection devices (in the case of FIG. 2, a detection device 703 and a detection device 704). In the description hereinafter, for convenience of description, it is assumed that the number of information processing devices is two.

The observation device 702 observes the information processing system 701, which includes the information processing device 705, the information processing device 706 and the like. For example, the observation device 702 observes processes executed in an information processing device, communications performed among a plurality of information processing devices, and the like.

In an information processing device, an agent operates that observes behavior of processes and the like running in the information processing device, communication relating to the information processing device, and the like. For example, in the information processing system 701, which is exemplified in FIG. 2, an agent 707 observes behavior of processes and the like running in the information processing device 705. Hereinafter, processes and information processing devices are collectively referred to as "processing objects".

Similarly, an agent 708 observes behavior of processes and the like running in the information processing device 706. In other words, an agent generates observation result information that indicates a result of observation (for example, information on processes and information on communications) with respect to an information processing device that includes the agent by observing processes and the like running in the information processing device. For example, an agent, with respect to each process, observes a communication destination (for example, a communication port) when the process performed a communication, a timing and a time period of a communication that the process established with an external communication network, a signature relating to the process, a file that the process accessed, and the like.

Observation targets that represent targets observed by an agent may include not only processes but also, for example, users who use the information processing device, communications (for example, electronic mails and references to web pages) performed by the users, and the like. In this case, the agent observes, for example, accounts set up in the information processing device, time periods during which the users used the information processing device, the names of processes that the users started, and the like and generates observation result information that indicates results of the observation. Hereinafter, examples of targets observed by an agent will be described in detail.

An agent observes information, such as a process and a socket with respect to processing in an information processing device where the agent runs.

The agent stores the generated observation result information in a storage unit such as the history information storage unit 709.

Figure 4:
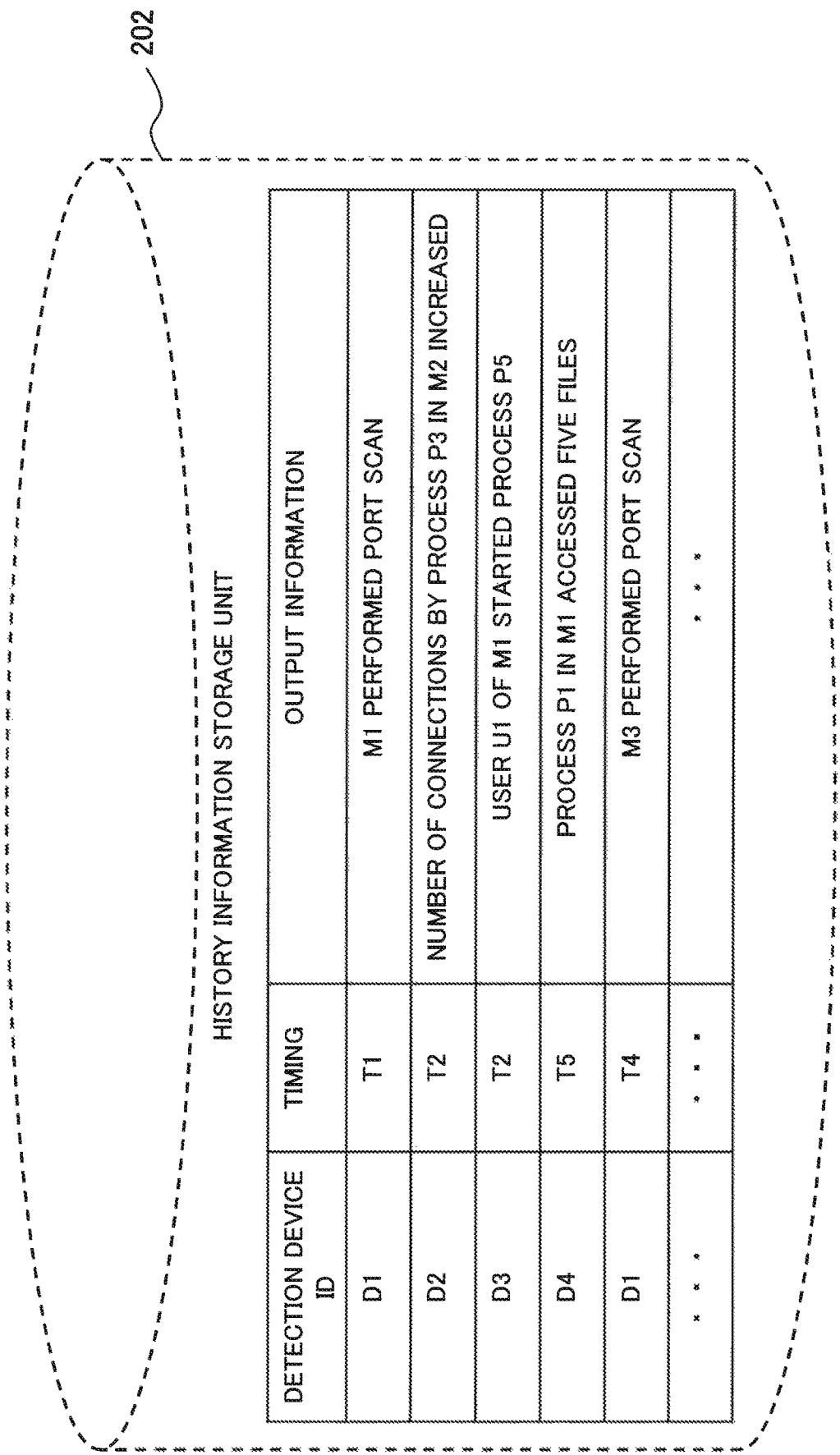
FIG. 4 is a diagram conceptually illustrating an example of history information stored in a history information storage unit.

When detecting an abnormality by analyzing observation result information generated by an agent, a detection device (for example, the detection device 703 and the detection device 704) generates a piece of history information (exemplified in FIG. 4) that includes a piece of output information indicating the detected abnormality and stores the generated piece of history information in the history information storage unit 709. With reference to FIG. 4, the history information will be described in detail below. FIG. 4 is a diagram conceptually illustrating an example of the history information stored in the history information storage unit 202. The history information stored in the history information storage unit 709 has a similar configuration to that of the history information stored in the history information storage unit 202. The history information does not always have to be stored in the history information storage unit 202 and may, for example, be received from an external device (not illustrated) or the like.

The history information is information in each piece of which, for example, a detection device ID representing a detection device that detects an abnormality relating to an information processing device, a timing at which the detection device detected the abnormality, and a piece of output information indicating an event detected in relation to the abnormality are associated with one another. The ID represents an identifier. The piece of output information includes information on an information processing device (a process, an account, or the like) relating to which the detection device detected the abnormality.

In the history information exemplified in FIG. 4, a detection device ID "D4", a timing "T5", and a piece of output information "Process P1 in M1 accessed five files" are associated with one another. This piece of history information indicates that a detection device identified by the detection device ID "D4" generated the piece of output information "Process P1 in M1 accessed five files" at the timing "T5". The symbol "M1" in the piece of output information indicates a processing device ID that is capable of identifying an information processing device. In addition, the "process P1" in the piece of output information indicates a process identified by the process ID "P1". In other words, the piece of output information represents a piece of information "In an information processing device identified by the processing device ID "M1", a process identified by the process ID "P1" accessed five files".

A detection device detects an abnormality relating to an information processing device, based on observation result information generated by an agent and the like. In the information processing system 701 exemplified in FIG. 2, the number of detection devices included in the observation device 702 is two (the detection device 703 and the detection device 704 in FIG. 2). However, the observation device 702 may include more than two detection devices. The detection devices are, for example, first to tenth detection devices described below.

First detection device: The first detection device detects an information processing device that performed an abnormal communication, based on a network topology (hereinafter, referred to as "topology information") that indicates a communication status among the information processing devices in the information processing system 701. The first detection device, for example, detects that a communication was performed from one information processing device to a lot of other information processing devices, and the like.

Second detection device: The second detection device detects a process that performed an abnormal communication, based on information (hereinafter, referred to as "process port information") in each piece of which a process executed by an information processing device in the information processing system 701 and a port number(s) representing a destination(s) to which the process transmitted data are associated with each other.

Third detection device: The third detection device detects an information processing device that performed an abnormal communication in the information processing system 701 and a process that executed the abnormal communication, based on the topology information and the process port information. The third detection device, for example, detects that a process in an information processing device performed communications with a lot of ports, and the like, based on the topology information and the process port information.

Fourth detection device: The fourth detection device detects an information processing device (or a process) that performed an abnormal communication, and the like, based on observation result information relating to a communication(s) performed by a process in an information processing device in the information processing system 701. The fourth detection device calculates the number of times of communication connection that a process in an information processing device established during a period of time by referring to the observation result information and detects that the information processing device (or the process) is abnormal when the calculated number of times of communication connection differs from the stationary number of time of communication connection.

Fifth detection device: The fifth detection device detects an abnormality relating to an information processing device, based on information (hereinafter, referred to as "user process information") in each piece of which an account set up in the information processing device in the information processing system 701 and a process ID representing a process that a user identified by the account started are associated with each other. The fifth detection device, for example, detects an account and the like that executed a process started by software that is likely to be malware.

Sixth detection device: The sixth detection device detects an abnormal information processing device (or an abnormal process) in the information processing system 701 by referring to information (hereinafter, referred to as "process file information") in each piece of which a process ID and a file ID of a file accessed by the process ID are associated with each other.

Seventh detection device: The seventh detection device detects an abnormal information processing device (or an abnormal process) in the information processing system 701 by referring to information (hereinafter, referred to as "signature information") each piece of which relates to a signature of a process identified by a process ID. Each piece of signature information includes, for example, the type of a value to which a process refers, the type of a value that the process outputs, and a name of the process.

Eighth detection device: The eighth detection device detects an abnormal information processing device (or an abnormal process) in the information processing system 701 by referring to information (hereinafter, referred to as "process file information") in each piece of which a process ID and a file ID of a file having been accessed by a process identified by the process ID are associated with each other.

Ninth detection device: The ninth detection device detects an abnormal information processing device by referring to information (hereinafter, referred to as "account information") in each piece of which a piece of information indicating an account having been set up in an information processing device in the information processing system 701 and a timing at which the account was set up are associated with each other.

Tenth detection device: The tenth detection device detects an abnormal information processing device in the information processing system 701, based on information (hereinafter, referred to as "login information") in each piece which an account and a time period during which a user identified by the account has used an information processing device are associated with each other. The tenth detection device specifies a time period during which an account set up in an information processing device has been used based on the login information.

Note that, in each information processing device, an agent is capable of generating information to which the above-described respective detection devices refer (the process port information, the signature information, the user process information, the login information, and the like).

Figure 5:
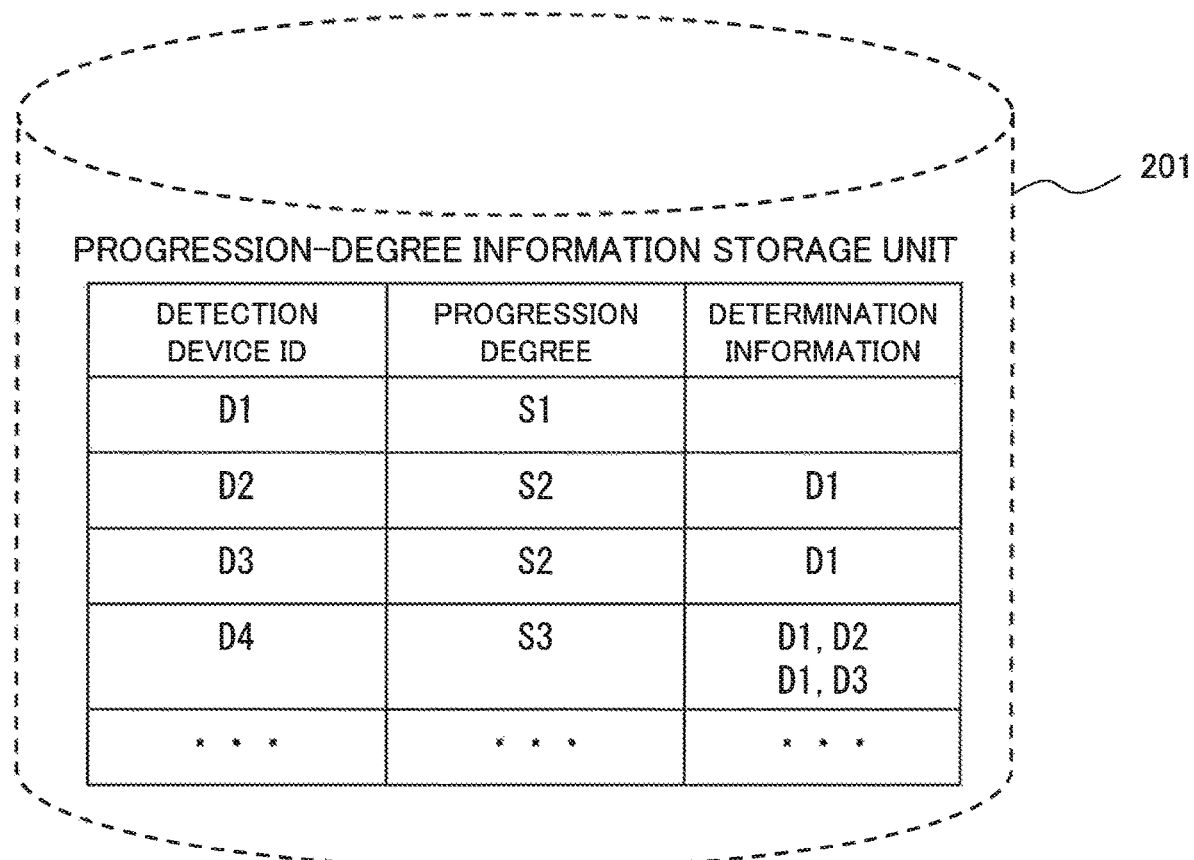
FIG. 5 is a diagram conceptually illustrating an example of progression-degree information stored in a progression-degree information storage unit.

Next, with reference to FIG. 5, the progression-degree information will be described. FIG. 5 is a diagram conceptually illustrating an example of the progression-degree information stored in the progression-degree information storage unit 201. The progression-degree information does not always have to be stored in the progression-degree information storage unit 201 and may, for example, be received from an external device (not illustrated) or the like.

The progression-degree information is, for example, information in each piece of which a detection device ID of a detection device that detects an abnormality relating to an information processing device and a piece(s) of determination information each of which includes zero or more detection device IDs in accordance with a predetermined order are associated with each other. In each piece of the progression-degree information, a progression degree may be further associated with a detection device ID. The predetermined order indicates an order in which, when, for example, the information processing system 701 is affected by software having malicious intent, detection devices are assumed to detect abnormalities. In this case, the predetermined order can be said to also indicate an order of timings at which detection devices are assumed to detect abnormalities or an order of detection devices that detect abnormalities. Although, in the description hereinafter, for convenience of description, it is assumed that the predetermined order is an order of timings, the predetermined order may also be a reverse order of timings and only has to be an order in which detection device IDs are arranged in accordance with a fixed rule.

In the progression-degree information exemplified in FIG. 5, the detection device ID "D4", a progression degree "S3", and pieces of determination information "D1, D2" and "D1, D3" are associated with one another. This piece of progression-degree information indicates a determination condition by which, when a detection device identified by the detection device ID "D4" detected an abnormality relating to an information processing device, the diagnosis device 101 determines to what degree a state (abnormal event, state, or status) that can be assumed to have been produced (have occurred) in the information processing system 701 by an attack is profound. The determination processing will be described in detail.

The diagnosis device 101 inputs (receives) a piece of information indicating that, for example, the detection device identified by the detection device ID "D4" detected an abnormality relating to an information processing device. The diagnosis device 101 reads pieces of history information (FIG. 4) from the history information storage unit 202 and generates order information in which detection device IDs of detection devices that generated the pieces of history information are arranged in the order of timings at which the pieces of history information were generated. The diagnosis device 101 determines whether or not detection devices in the generated order information occur in accordance with the piece of determination information "D1, D2" or "D1, D3". When the order information is in accordance with either piece of determination information, the diagnosis device 101 determines that the progression degree relating to the information processing device is "S3".

"Order information being in accordance with determination information" indicates that the order of detection devices occurring in the order information and the order of detection devices occurring in the determination information do not contradict each other. For example, it is assumed that the order information is "D1, D2, D3" and the determination information is "D1, D3". In this case, since "D1" occurs previous to "D3" in both information, the order in the order information does not contradict the order in the determination information. For example, it is assumed that the order information is "D1, D2, D3" and the determination information is "D3, D2". In this case, since "D2" occurs previous to "D3" in the order information and "D3" occurs previous to "D2" in the determination information, the order in the order information contradicts the order in the determination information.

A null value for determination information in progression-degree information indicates that no determination information is set. In other words, when a detection device identified by the detection device ID associated with such determination information detected an abnormality relating to an information processing device, the diagnosis device 101 determines that the progression degree relating to the information processing device is a progression degree associated with the detection device ID. For example, in the progression-degree information exemplified in FIG. 5, the detection device ID "D1" is associated with a piece of determination information having a null value. This piece of progression-degree information indicates that, when an abnormality detected by a detection device identified by the detection device ID "D1" is an abnormality relating to an information processing device, the diagnosis device 101 diagnoses that the progression degree relating to the information processing device is "S1".

In other words, each piece of determination information included in the progression-degree information exemplified in FIG. 5 indicates an order of detection in a case where an information processing device is detected by a plurality of detection devices. For example, when an information processing device is detected by the detection device identified by the detection device ID "D1" and next detected by a detection device identified by the detection device ID "D2", the diagnosis device 101 determines that the progression degree relating to the information processing device is "S2" (a piece of progression-degree information exemplified in the second row in FIG. 5). For example, when an information processing device is detected by the detection device identified by the detection device ID "D1", the detection device identified by the detection device ID "D2", and the detection device identified by the detection device ID "D4" in this order, the diagnosis device 101 determines that the progression degree relating to the information processing device is "S3" (a piece of progression-degree information exemplified in the fourth row in FIG. 5). Alternatively, when an information processing device is detected by the detection device identified by the detection device ID "D1", a detection device identified by the detection device ID "D3", and the detection device identified by the detection device ID "D4" in this order, the diagnosis device 101 determines that the progression degree relating to the information processing device is "S3" (the piece of progression-degree information exemplified in the fourth line in FIG. 5).

Figure 3:
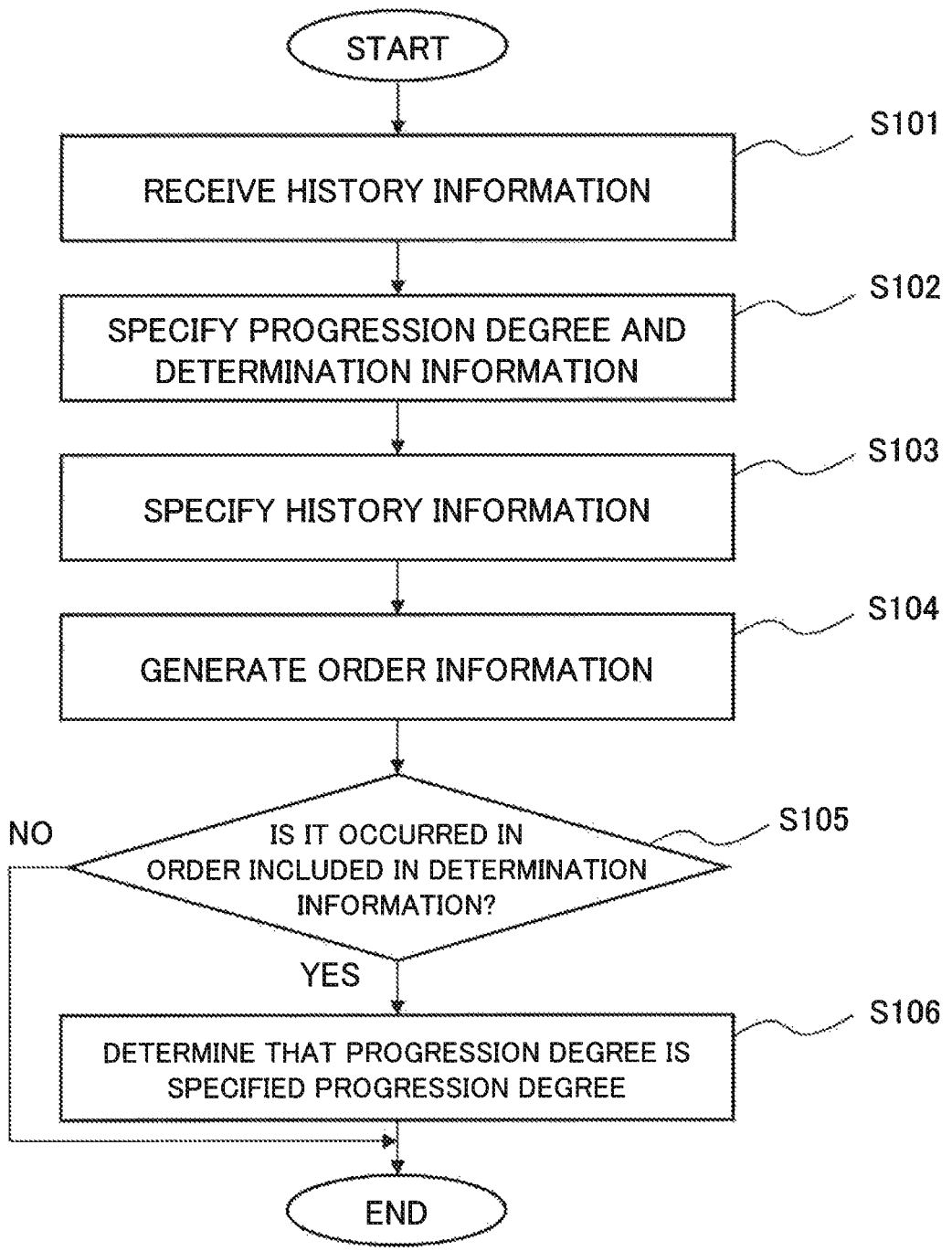
FIG. 3 is a flowchart illustrating a processing flow in the diagnosis device according to the first example embodiment.

Next, with reference to FIG. 3, processing in the diagnosis device 101 according to the first example embodiment of the present invention will be described in detail. FIG. 3 is a flowchart illustrating a processing flow in the diagnosis device 101 according to the first example embodiment.

For convenience of description, it is assumed that a detection device detected an abnormality relating to a first information processing device and output a piece of history information (for example, one row in FIG. 4) indicating the detected abnormality at a first timing. The first timing may also be a timing at which the first detection device detected the abnormality or a time at which the agent in the information processing device generated observation result information based on which a detection device detected the abnormality. That is, timings (in the above case, "first timing") are not limited to the above-described example.

The determination information specifying unit 102, for example, receives a piece of history information that a detection device output (step S101). As described above, in step S101, the determination information specifying unit 102 may, for example, input a piece of history information that a detection device stored in the history information storage unit 202. The determination information specifying unit 102 specifies a progression degree associated with the detection device ID of the detection device and a piece of determination information associated with the detection device ID by referring to the progression-degree information (FIG. 5) stored in the progression-degree information storage unit 201 (step S102).

Next, the order information generation unit 103 specifies a piece(s) of history information that is/are a piece(s) of history information generated at a timing(s) at or previous to the first timing and that include(s) a piece(s) of output information relating to the first information processing device by referring to the history information (FIG. 4) stored in the history information storage unit 202 (step S103). Next, the order information generation unit 103 generates order information in which a detection device ID(s) included in the specified piece(s) of history information is/are arranged in the order of a timing(s) included in the piece(s) of history information (step S104). The order of timing(s) does not always have to be an order of timing(s) at which the piece(s) of history information was/were generated. The order of timing(s) may, for example, be a reverse order of timing(s) at which the piece(s) of history information was/were generated and only has to be an order in which a detection device ID(s) is/are arranged in accordance with a predetermined order.

The progression-degree calculating unit 104 determines whether or not the detection device ID(s) included in the order information generated by the order information generation unit 103 occur(s) in the order of a detection device ID(s) included in the piece of determination information specified by the determination information specifying unit 102 (step S105). When determining that the detection device ID(s) included in the order information generated by the order information generation unit 103 occur(s) in the order of the detection device ID(s) included in the piece of determination information specified by the determination information specifying unit 102 (YES in step S105), the progression-degree calculating unit 104 determines that the progression degree relating to the first information processing device is the progression degree specified by the determination information specifying unit 102 (step S106). When the determination result is NO in step S105, the progression-degree calculating unit 104 does not perform the processing prescribed in step S106.

The progression-degree calculating unit 104 determines whether or not the detection device ID(s) included in order information occur(s) in the order of a detection device ID(s) included in determination information in step S105. Even when the order information includes a detection device ID other than the detection device ID(s) included in the determination information, the progression-degree calculating unit 104 determines YES in step S105 if the detection device ID(s) included in the order information occur(s) in the order of a detection device ID(s) included in the determination information. For example, when order information is "D1, D2, D3, D4" and determination information is "D1, D4", the detection device IDs in the order information occur in the order of "D1", "D2", "D3", and "D4". Therefore, the detection device IDs "D1" and "D4" in the determination information occur in the detection device IDs in the order information though the detection device IDs "D2" and "D3" occur between the detection device IDs "D1" and "D4"

With reference to a more specific example, the processing in the diagnosis device 101 according to the first example embodiment will be described. It is assumed that, in this example, a detection device identified by the detection device ID "D3" output, at a timing "T2", a piece of output information 'A user "U1" of an information processing device identified by a processing device ID "M1" started a process identified by a process ID "P5"' (the third row in the history information illustrated in FIG. 4).

The determination information specifying unit 102, for example, receives a piece of history information (the third row in the history information in FIG. 4) output by the detection device identified by the detection device ID "D3" (step S101). The determination information specifying unit 102 specifies a progression degree "S2" associated with the detection device ID "D3" and a piece of determination information "D1" associated with the detection device ID by referring to the progression-degree information (exemplified in FIG. 5) stored in the progression-degree information storage unit 201 (step S102).

Next, the order information generation unit 103 specifies a piece(s) of history information (a piece of history information illustrated in the first row in FIG. 4) that is/are a piece(s) of history information generated at a timing(s) (for example, a timing "T1") previous to the timing "T2" and that include(s) a piece(s) of output information relating to the processing device ID "M1" by referring to the history information (exemplified in FIG. 4) stored in the history information storage unit 202 (step S103). Next, the order information generation unit 103 generates order information (in this example, "D1") in which a detection device ID(s) included in the specified piece(s) of history information is/are arranged in the order of the timing(s) included in the piece(s) of history information (step S104).

The progression-degree calculating unit 104 determines whether or not the detection device ID(s) included in the order information (in this example, "D1") generated by the order information generation unit 103 occur(s) in the order of the detection device ID(s) included in the piece of determination information (in this example, "D1") specified by the determination information specifying unit 102 (step S105). In this example, the detection device ID included in the order information "D1" generated by the order information generation unit 103 occurs in the order of the detection device ID included in the piece of determination information "D1" specified by the determination information specifying unit 102 (YES in step S105). Therefore, the progression-degree calculating unit 104 determines that the progression degree relating to the first information processing device is the progression degree "S2" specified by the determination information specifying unit 102 (step S106).

Next, an advantageous effect relating to the diagnosis device 101 according to the first example embodiment will be described.

The diagnosis device 101 according to the present example embodiment enables a degree of an abnormality having occurred in the information processing system 701 to be detected accurately. The reason for the advantageous effect is because not only does the diagnosis device 101 determine a progression degree merely by combining results of detection by a plurality of detection devices but also the diagnosis device 101 determines a progression degree in accordance with an order of detection device IDs included in determination information in progression-degree information. The reason will be described in detail.

The inventors of the present invention have found that steps used when software having malicious intent, such as malware, attacks an information processing device have some tendency. For example, such steps are steps as described below.

(Step 1) From an information processing device, the software scans ports of other information processing devices.

(Step 2) The software generates an account with high privileges in an information processing device.

(Step 3) The software alters a program, such as a library, using the generated account.

(Step 4) The software executes an infected program in an information processing device.

(Step 5) The software takes out a file.

Therefore, the diagnosis device 101 according to the present example embodiment can detect a degree of an abnormality having occurred in the information processing system 701 accurately by performing diagnosis relating to an information processing device in a stepwise manner in accordance with predetermined steps reflecting the above-described tendency.

Note that, although, in the above-described example, the diagnosis device 101 calculates a progression degree relating to an information processing device when a detection device makes detection, the diagnosis device 101 may calculate a progression degree relating to an information processing device by referring to information generated when a detection device made detection. The diagnosis device 101 is not limited to the above-described example.

Second Example Embodiment

Next, a second example embodiment of the present invention configured based on the above-described first example embodiment will be described.

In the description hereinafter, description will be made mainly on a characteristic portion according to the present example embodiment, and, in conjunction therewith, by providing the same components as those in the above-described first example embodiment with the same reference symbols, an overlapping description thereof will be omitted.

Figure 6:
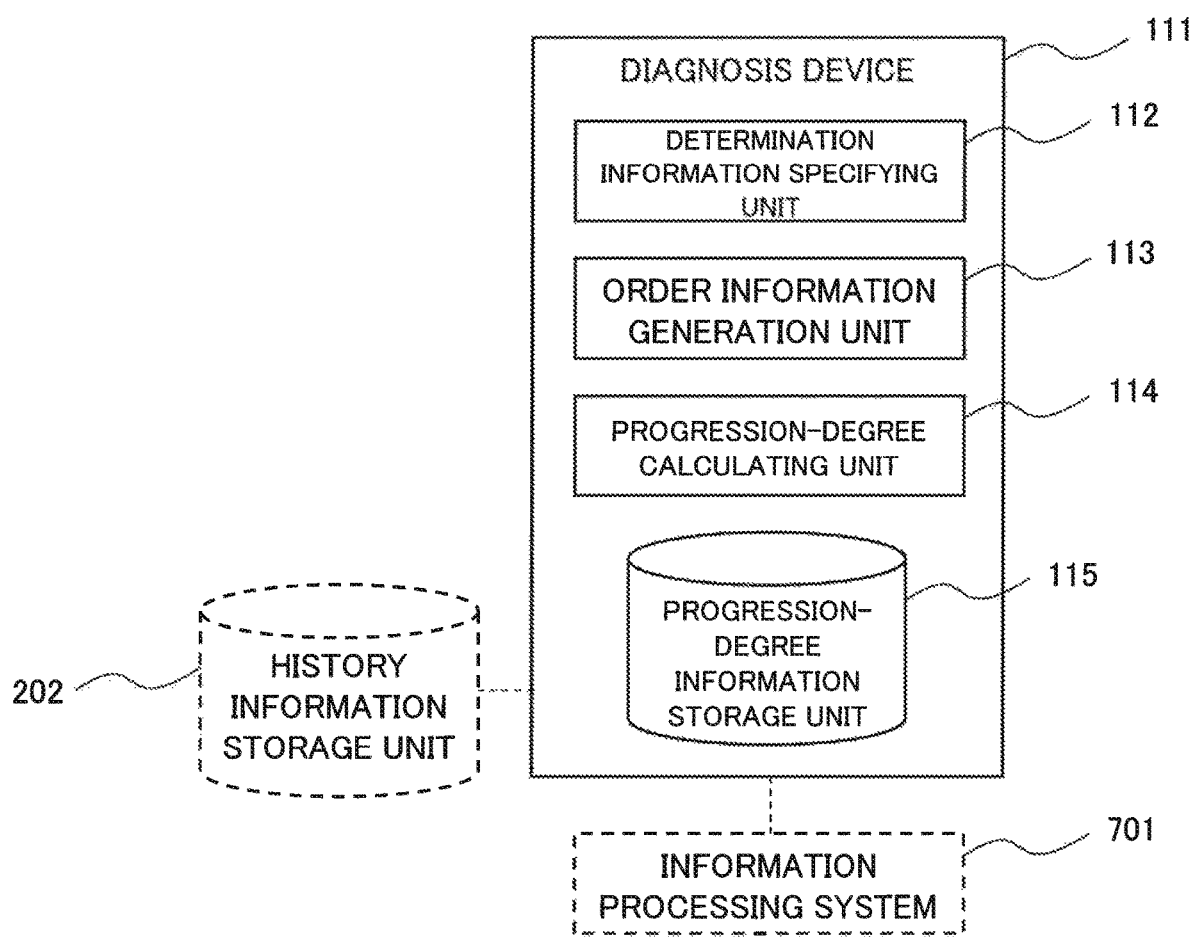
FIG. 6 is a block diagram illustrating a configuration of a diagnosis device according to a second example embodiment of the present invention.

With reference to FIG. 6, a configuration of a diagnosis device 111 according to the second example embodiment of the present invention will be described in detail. FIG. 6 is a block diagram illustrating a configuration of the diagnosis device 111 according to the second example embodiment of the present invention.

The diagnosis device 111 according to the second example embodiment includes a determination information specifying unit (determination information specifier) 112, an order information generation unit (order information generator) 113, a progression-degree calculating unit (progression-degree calculator) 114, and a progression-degree information storage unit 115.

The diagnosis device 111 calculates a progression degree relating to an information processing device, based on progression-degree information (exemplified in FIG. 8 and will be described later) stored in the progression-degree information storage unit 115 and history information (exemplified in FIG. 4) stored in a history information storage unit 202. The progression-degree information does not always have to be stored in the progression-degree information storage unit 115 and may, for example, be received from an external device (not illustrated) or the like. The history information does not always have to be stored in the history information storage unit 202 and may, for example, be received from an external device (not illustrated) or the like.

Hereinafter, the progression-degree information (exemplified in FIG. 8) that serves as a base when the diagnosis device 111 diagnoses based on information detected by detection devices in an information processing system 701 will be described. Thereafter, with reference to FIG. 7, processing in the diagnosis device 111 will be described.

With reference to FIG. 8, the progression-degree information will be described. FIG. 8 is a diagram conceptually illustrating an example of the progression-degree information as a table for convenience of description. The progression-degree information does not always have to have a form as exemplified in FIG. 8 and may have a form as exemplified in FIG. 4. In addition, the progression-degree information does not always have to be stored in the progression-degree information storage unit 115 and may, for example, be received from an external device (not illustrated) or the like.

In the progression-degree information, names representing detection devices and progression degrees to be determined by the diagnosis devices are associated with each other. The progression-degree information includes names representing the first to tenth detection devices described in the first example embodiment. The names of the detection devices represent, for example, detection device IDs ("D1", "D2", and the like) in the progression-degree information exemplified in FIG. 5.

The progression-degree information includes nine progression degrees described below. That is, "Network search activity": an information processing device exhaustively checks whether or not any of other information processing devices has a vulnerability. For example, an information processing device exhaustively checks whether or not a port that another information processing device has is open. That is, an information processing device checks whether or not communication connection can be established with another information processing device by way of a communication network.

"C&C communication": The number of times of communication connection established by an information processing device is far greater than the average number of times of communication connection established by other information processing devices. That is, the number of times of communication connection established by the information processing device is abnormal. The C&C represents an acronym of the words "command and control".

"Lateral movement": When an information processing device has infiltrated another information processing device, the information processing device transmits information including processing to be performed in the infiltrated information processing device to the infiltrated information processing device by way of a communication network. That is, an information processing device transmits processing information including processing to be performed in an infiltration destination that the information processing device has infiltrated by way of a communication network to the infiltration destination.

"Generation of a new user and elevation of its privilege": In an information processing device, an account having access privilege is generated, and, further, a period of time during which the account is used is far longer than an average period of use with respect to other accounts. That is, in an information processing device, an account having an abnormal period of use is set up.

"Search of an important file": In an information processing device, a predetermined file, such as a password file, is searched.

"Alteration of a program, a DLL, a configuration file, a log, and the like": In an information processing device, files, such a DLL, a password file, and information (log) indicating performed processing, are updated. The DLL represents an acronym of the words "dynamic link library".

"Execution of an infected program": In an information processing device, a specific program that is likely to be malware is executed.

"Access to and destruction of an important file": In an information processing device, a predetermined file, such as a password file, is read out. Further, processing, such as deletion and conversion into a form that is unrestorable, is performed on the predetermined file.

"Takeout of an important file": In an information processing device, a predetermined file, such as a password file, is transmitted by way of a communication network.

The above progression degrees indicate, for example, detection device IDs ("S1", "S2", and the like) in the progression-degree information exemplified in FIG. 5. The above nine progression degrees are progression degrees that the inventors of the present invention have found as steps used in sequence from the top when software having malicious intent, such as malware, attacks an information processing device.

In the progression-degree information exemplified in accordance with a table format in FIG. 8, associations are defined and stored (marked) at rows having names "First", "Second", and "Third" in a column having the progression degree "Network search activity". Note that, in the progression-degree information exemplified in FIG. 8, when a progression degree and a name are associated with each other, the state of being associated with each other is indicated with a circle. The above marking, for example, indicates that, when the first detection device, the second detection device, and the third detection device detect that an information processing device is performing a network search activity, the diagnosis device 111 determines that the progression degree relating to the information processing device is the progression degree "Network search activity".

In the progression-degree information exemplified in FIG. 8, a circle appears at a row having a name "Fourth" in a column having the progression degree "C&C communication". This marking indicates that, when, with respect to an information processing device having been determined to be in the progression degree "Network search activity" by the diagnosis device 111, the fourth detection device further makes detection, the diagnosis device 111 determines that the progression degree relating to the information processing device is the progression degree "C&C communication". That is, when, with respect to an information processing device, the first to third detection devices detected an abnormality and subsequently the fourth detection device detects an abnormality, the diagnosis device 111 determines that the progression degree relating to the information processing device is the progression degree "C&C communication".

With respect to the progression degree "Lateral movement" in the progression-degree information exemplified in FIG. 8, the diagnosis device 111 performs similar processing to the processing performed with respect to the progression degree "C&C communication". That is, when, with respect to an information processing device, the first to third detection devices detected an abnormality, the fourth detection device subsequently detected an abnormality, and, further, the first to third detection devices detect an abnormality, the diagnosis device 111 determines that the progression degree relating to the information processing device is the progression degree "Lateral movement".

In the progression-degree information exemplified in FIG. 8, circles appear at rows having names "Ninth" and "Tenth" in a column having the progression degree "Generation of a new user and elevation of its privilege". This marking indicates determination processing performed when, with respect to a second information processing device that communicated with an information processing device determined to be in the progression degree "Lateral movement" by the diagnosis device 111, the ninth detection device and the tenth detection device further make detection. That is, the determination processing is processing in which the diagnosis device 111 determines that the progression degree relating to the second information processing device is the progression degree "Generation of a new user and elevation of its privilege".

In the progression-degree information exemplified in FIG. 8, a circle appears at a row having a name "Sixth" in a column having the progression degree "Search of an important file". This marking indicates that, when, with respect to an information processing device determined to be in the progression degree "Generation of a new user and elevation of its privilege" by the diagnosis device 111, the sixth detection device further makes detection, the diagnosis device 111 determines that the progression degree relating to the information processing device is the progression degree "Search of an important file".

With respect to the progression degrees "Alteration of a program, a DLL, a configuration file, a log, and the like", "Execution of an infected program", and "Access to and destruction of an important file" in the progression-degree information exemplified in FIG. 8, the diagnosis device 111 performs similar processing to the processing performed with respect to the progression degree "Search of an important file".

In the progression-degree information exemplified in FIG. 8, circles appear at the rows having the names "First" and "Second" in a column having the progression degree "Takeout of an important file". This marking indicates that, when, with respect to an information processing device determined to be in the progression degree "Access to and destruction of an important file" by the diagnosis device 111, the first and second detection devices further make detection, the diagnosis device 111 determines that the progression degree relating to the information processing device is the progression degree "Takeout of an important file". That is, when the diagnosis device 111 successively determined that the progression degree relating to an information processing device (or another information processing device that communicated with the information processing device) was the progression degrees "Network search activity" to "Access to and destruction of an important file" and the first and second detection devices further make detection, the diagnosis device 111 determines that the progression degree is the progression degree "Takeout of an important file".

In other words, the progression-degree information exemplified in FIG. 8 is information that indicates a base used when each progression degree is determined based on an order of detection made by detection devices (that is, each piece of determination information in the progression-degree information exemplified in FIG. 5). When determining whether or not an information processing device is in a certain progression degree in accordance with the progression-degree information exemplified in FIG. 8, the diagnosis device 111 reads the names of detection devices (detection device IDs) to which circles are assigned in the order of progression degrees from the progression-degree information. Based on the read information (that is, a piece of determination information in FIG. 5), the diagnosis device 111 determines whether or not the information processing device is in the certain progression degree.

In the progression-degree information exemplified in FIG. 8, determination processing relating to the progression degrees "Network search activity", "C&C communication", "Lateral movement", and "Takeout of an important file" is performed based on information on communication processing performed by way of a communication network. In addition, in the progression-degree information exemplified in FIG. 8, determination processing relating to the progression degrees "Generation of a new user and elevation of its privilege", "Search of an important file", and "Alteration of a program, a DLL, a configuration file, a log, and the like" is performed based on information on information processing devices (or processes executed in the information processing devices). Similarly, determination processing relating to the progression degrees "Execution of an infected program" and "Access to and destruction of an important file" is performed based on information on information processing devices (or processes executed in the information processing devices).

Next, with respect to the progression-degree information exemplified in FIG. 8, processing performed when a plurality of detection devices make detection will be described.

Detection processing with respect to the progression degree "Network search activity" will be described. The first detection device detects an information processing device(s) (or a process(es)) from which communication was performed with a lot of information processing devices, based on communication information (an example of observation result information) generated by agents and topology information indicating a communication status among the information processing devices in the information processing system 701. The second detection device detects a process(es) performing an abnormal communication(s) in an information processing device(s), based on process port information generated by the agents. The third detection device detects a process(es) that is/are common to both the process(es) detected by the first detection device and the process(es) detected by the second detection device.

Detection processing with respect to the progression degree "Lateral movement" will be described. When the first detection device detects that, for example, frequency at which communications were performed between two information processing devices increased abruptly based on two information, that is the communication information (an example of the observation result information) generated by the agents and the topology information indicating a communication status, the first detection device detects the two information processing devices (or processes). The second detection device detects a process(es) performing an abnormal communication(s) in an information processing device(s) based on the process port information generated by the agents. The third detection device detects a process(es) that is/are common to both the processes detected by the first detection device and the process(es) detected by the second detection device.

Detection processing with respect to the progression degree "Generation of a new user and elevation of its privilege" will be described. The ninth detection device detects an account(s) the period(s) of use of which is/are longer than a predetermined time by referring to account information (an example of the observation result information) generated by the agents. The tenth detection device specifies a time period(s) during which the account(s) detected by the ninth detection device is/are used by referring to login information generated by the agents. When the specified period(s) of time is/are far longer than an average value of time periods during which accounts other than the account(s) are used and the account(s) has/have wide access privileges, the tenth detection device detects that the account(s) (or the information processing device(s)) is abnormal.

Detection processing with respect to the progression degree "Execution of an infected program" will be described. The seventh detection device compares signature information (an example of the observation result information) generated by the agents among a plurality of information processing devices with each other. When a process(es) having signature information different from the other process(es) is/are executed in an information processing device(s), the seventh detection device detects the process(es). The eighth detection device determines whether or not the number of files that the process(es) detected by the seventh detection device accessed increased in a short period of time by referring to process file information (an example of the observation result information) generated by the agents. When the number of such files increased in a short period of time, the eighth detection device detects the process(es) as a process(es) related to an infected program. The fifth detection device determines whether or not a user started the process(es) detected by the eighth detection device by referring to user process information generated by the agents. When determining that a user started the process(es), the fifth detection device detects an information processing device(s) where the process(es) was/were started as an information processing device(s) where a program that is likely to be malware was executed.

Detection processing with respect to the progression degree "Access to and destruction of an important file" will be described. The fifth detection device detects a process(es) started in relation to software that is likely to be malware by referring to the user process information (an example of the observation result information) generated by the agents. The sixth detection device specifies a file ID(s) associated with the process ID(s) representing the process(es) detected by the fifth detection device by referring to the process file information (an example of the observation result information) generated by the agents. When a file(s) identified by the specified file ID(s) is/are a DLL(s) and the like, the sixth detection device detects the process(es).

Detection processing with respect to the progression degree "Takeout of an important file" will be described. The first detection device generates topology information indicating a communication status among information processing devices in the information processing system 701 based on the communication information (an example of the observation result information) generated by the agents. The first detection device detects an information processing device(s) that performed communications with a lot of information processing devices based on the topology information. Further, the second detection device detects a process(es) performing abnormal communications, based on the process port information (an example of the observation result information) generated by the agents. When an information processing device(s) determined to be in the progression degree "Takeout of an important file" is/are the information processing device(s) detected by the first detection device and, further, the process(es) detected by the second detection device is/are executed in the information processing device(s), the diagnosis device 111 determines that the progression degree (s) relating to the information processing device(s) is/are the progression degree "Takeout of an important file".

Note that processing performed with respect to the respective progression degrees is not limited to the above-described examples.

Next, with reference to FIG. 7, processing in the diagnosis device 111 according to the second example embodiment of the present invention will be described in detail. FIG. 7 is a flowchart illustrating a processing flow in the diagnosis device 111 according to the second example embodiment.

The determination information specifying unit 112 receives a piece of history information that a detection device (for convenience of description, assumed to be the fifth detection device) output (step S111). As described above, in step S111, the determination information specifying unit 112 may, for example, input a piece of history information (exemplified in FIG. 4) that the fifth detection device stored in the history information storage unit 202. The determination information specifying unit 112 specifies a progression degree (s) associated with the detection device ID representing the detection device (in this case, the fifth detection device) and a piece(s) of determination information associated with the detection device ID by referring to the progression-degree information (FIG. 8) stored in the progression-degree information storage unit 115.

Specifically, when the detection device ID is "Fifth", the determination information specifying unit 112 specifies the progression degree "Alteration of a program, a DLL, a configuration file, a log, and the like" associated with "Fifth" by referring to the history information (exemplified in FIG. 8, areas where circles appears) (step S112). Further, the determination information specifying unit 112 specifies the progression degrees "Execution of an infected program" and "Access to and destruction of an important file". The determination information specifying unit 112, with respect to the progression degree "Alteration of a program, a DLL, a configuration file, a log, and the like", specifies the progression degrees "Network search activity" to "Search of an important file", which are progression degrees preceding the progression degree (step S113). The determination information specifying unit 112, with respect to the progression degree "Execution of an infected program", further specifies the progression degrees "Network search activity" to "Alteration of a program, a DLL, a configuration file, a log, and the like", which are progression degrees preceding the progression degree.

The determination information specifying unit 112, with respect to the progression degree "Access to and destruction of an important file", also specifies the progression degrees "Network search activity" to "Execution of an infected program". In the description hereinafter, for convenience of description, processing performed by the diagnosis device 111 will be described with reference to an example of the case where the progression degree "Alteration of a program, a DLL, a configuration file, a log, and the like" is specified. Since processing in the diagnosis device 111 in cases where the progression degrees "Execution of an infected program" and "Access to and destruction of an important file" are specified is similar to processing in the diagnosis device 111 in the case where the progression degree "Alteration of a program, a DLL, a configuration file, a log, and the like" is specified, a description thereof will be omitted.

Next, the determination information specifying unit 112 specifies the detection device IDs of detection devices outputting pieces of information that are referred to when the specified progression degrees are determined (that is, the names of detection devices at rows where circles appear with respect to the respective progression degrees) and specifies the specified names in the order of progression degrees (in the order from the left side to the right side in FIG. 8) (step S114). For example, the determination information specifying unit 112 specifies the detection device IDs "First", "Second", and "Third" with respect to the progression degree "Network search activity". The determination information specifying unit 112 specifies the detection device ID "Fourth" with respect to the progression degree "C&C communication". The determination information specifying unit 112 specifies the detection device IDs "First", "Second", and "Third" with respect to the progression degree "Lateral movement". The determination information specifying unit 112 specifies the detection device IDs "Ninth" and "Tenth" with respect to the progression degree "Generation of a new user and elevation of its privilege". Further, the determination information specifying unit 112 specifies the detection device ID "Sixth" with respect to the progression degree "Search of an important file".

When a plurality of detection device IDs are associated with one another with respect to a progression degree, processing in the detection devices identified by the respective detection device IDs determines whether or not an information processing device is detected, as described with reference to FIG. 5. Hereinafter, for convenience of description, it is assumed that, with respect to a progression degree, whether or not an information processing device is detected is determined based on a result of one detection device's determination. However, whether or not an information processing device is detected does not always have to be determined based on a result of one detection device's determination.

When an assumption as described above is made, the determination information specifying unit 112 generates a piece of determination information including, for example, the detection device IDs "First", "Fourth", "First", "Ninth", and "Sixth" in this order (step S115).

Next, the order information generation unit 113 specifies a piece(s) of history information that is/are a piece(s) of history information generated at a timing(s) at or previous to a first timing and that include(s) a piece(s) of output information relating to a first information processing device by referring to the history information stored in the history information storage unit (step S116). Next, the order information generation unit 113 generates order information in which a detection device ID(s) included in the specified piece(s) of history information is/are arranged in the order of a timing(s) included in the piece(s) of history information (step S117). Note that the order of timing(s) does not always have to be an order of timing(s) at which the piece(s) of history information was/were generated. The order of timing(s) may, for example, be a reverse order of timing(s) at which the piece(s) of history information was/were generated and only has to be an order in which a detection device ID(s) is/are arranged in accordance with a predetermined order.

The progression-degree calculating unit 114 determines whether or not the detection device ID(s) included in the order information generated by the order information generation unit 113 occur(s) in the order of a detection device ID(s) included in the piece of determination information specified by the determination information specifying unit 112 (step S118). When determining that the detection device ID(s) included in the order information generated by the order information generation unit 113 occur(s) in the order of the detection device ID(s) included in the piece of determination information specified by the determination information specifying unit 112 (YES in step S118), the progression-degree calculating unit 114 determines that the progression degree relating to the first information processing device is the progression degree specified by the determination information specifying unit 112 (step S119). When the determination result is NO in step S118, the progression-degree calculating unit 114 does not perform the processing prescribed in step S119.

For example, the progression-degree calculating unit 114 determines whether or not the order information generated by the order information generation unit 113 includes the detection device IDs "First", "Fourth", "First", "Ninth", and "Sixth" in this order. When determining that the order information includes the detection device IDs in this order, the progression-degree calculating unit 114 determines that the progression degree relating to the information processing device is the progression degree "Alteration of a program, a DLL, a configuration file, a log, and the like".

Next, advantageous effects relating to the diagnosis device 111 according to the second example embodiment will be described.

The diagnosis device 111 according to the present example embodiment enables a degree of an abnormality having occurred in the information processing system 701 to be detected accurately. The reason for the advantageous effect is the same as the reason for the advantageous effect obtained by the diagnosis device 101 according to the first example embodiment.

Further, the diagnosis device 111 according to the present example embodiment enables a degree of an abnormality having occurred in the information processing system 701 to be detected more accurately. This is because the progression-degree information (FIG. 8) is generated in an order in accordance with steps of an attack that the inventors of the present invention have found and, further, the diagnosis device 111 detects an abnormality relating to an information processing device based on the progression-degree information.

Third Example Embodiment

Figure 9:
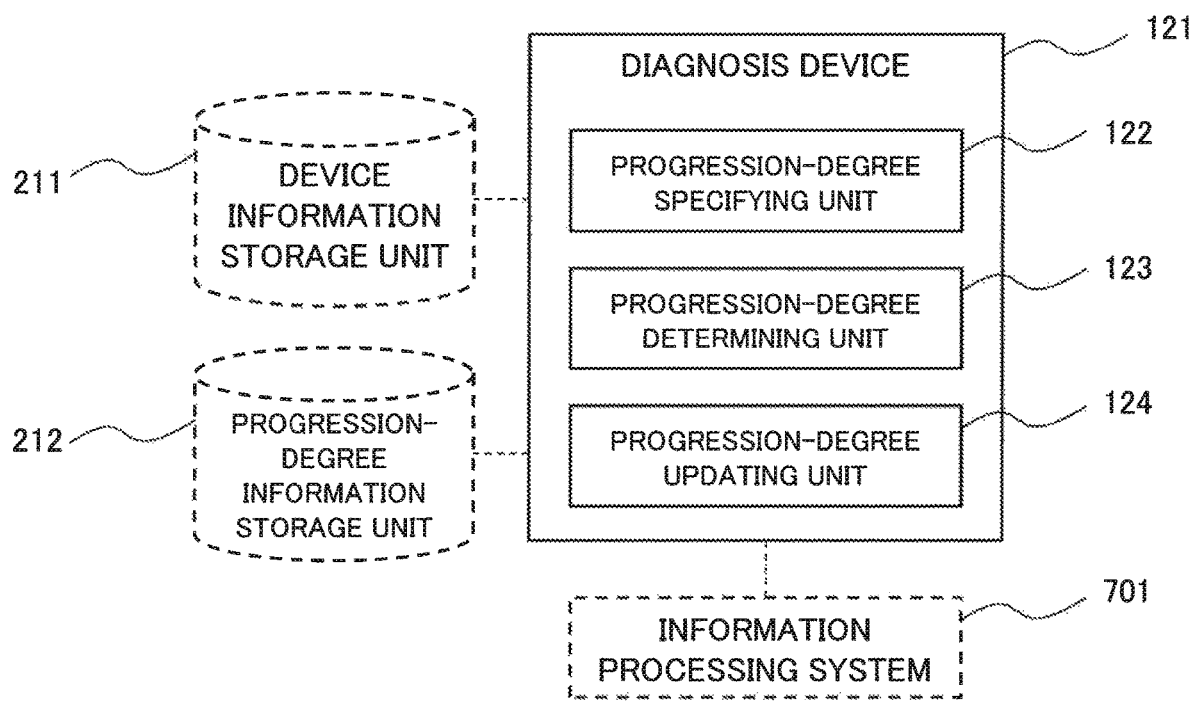
FIG. 9 is a block diagram illustrating a configuration of a diagnosis device according to a third example embodiment of the present invention.

With reference to FIG. 9, a configuration of a diagnosis device 121 according to a third example embodiment of the present invention will be described in detail. FIG. 9 is a block diagram illustrating a configuration of the diagnosis device 121 according to the third example embodiment of the present invention.

The diagnosis device 121 according to the third example embodiment includes a progression-degree specifying unit (progression-degree specifier) 122, a progression-degree determining unit (progression-degree determiner) 123, and a progression-degree updating unit (progression-degree updater) 124.

The diagnosis device 121 is capable of referring to progression-degree information (exemplified in FIG. 11 and will be described later) that is stored in a progression-degree information storage unit 212. The diagnosis device 121 is capable of referring to and updating device information (exemplified in FIG. 12 and will be described later) that is stored in a device information storage unit 211. Although, in the description hereinafter, for convenience of description, it is assumed that the progression-degree information is stored in the progression-degree information storage unit 212, the progression-degree information may be received from an external device. Similarly, although, for convenience of description, it is assumed that the device information is stored in the device information storage unit 211, the device information may be received from an external device.

Figure 11:
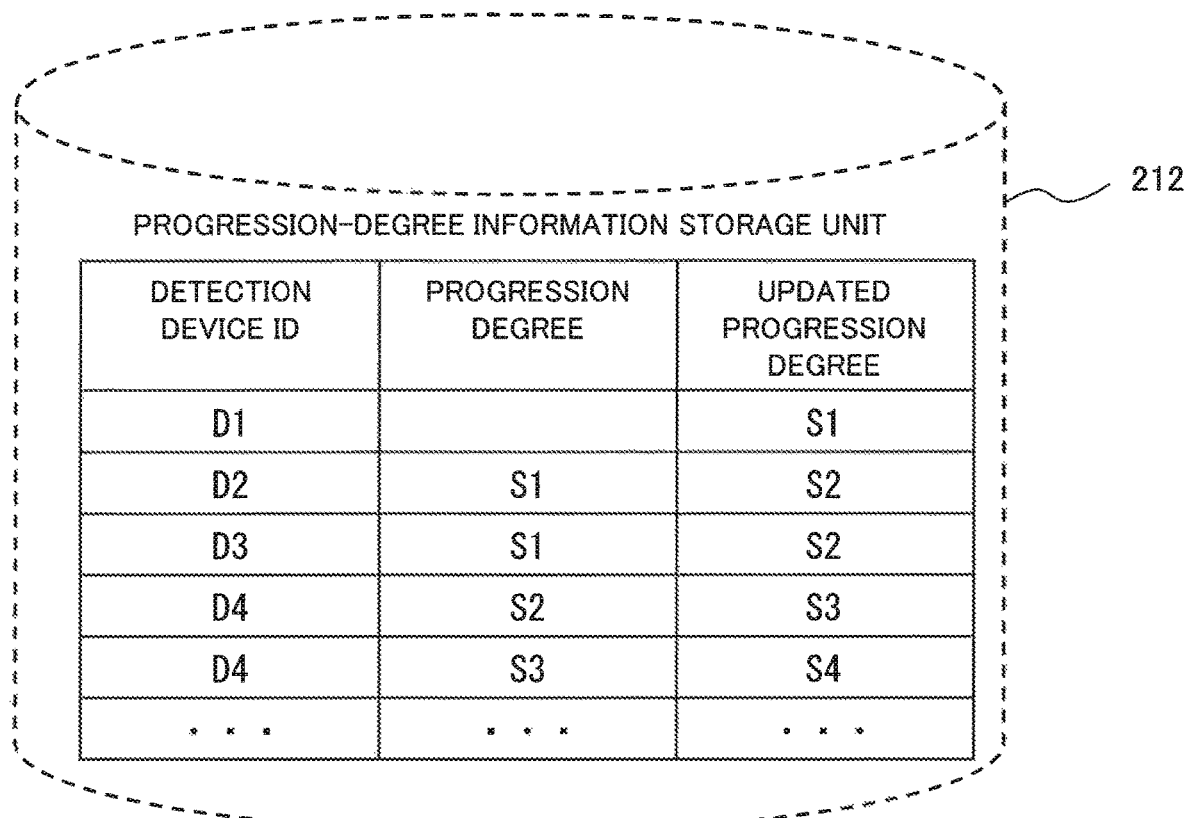
FIG. 11 is a diagram conceptually illustrating an example of progression-degree information stored in a progression-degree information storage unit.

With reference to FIG. 11, the progression-degree information will be described. FIG. 11 is a diagram conceptually illustrating an example of the progression-degree information stored in the progression-degree information storage unit 212. The progression-degree information does not always have to be stored in the progression-degree information storage unit 212 and may, for example, be received from an external device (not illustrated) or the like.

The progression-degree information is information in each piece of which a detection device ID representing a detection device, a progression degree relating to an information processing device, and a progression degree after update (hereinafter, referred to as an "updated progression degree") that is set with respect to the information processing device when the information processing device is in the progression degree and, further, the detection device identified by the detection device ID detects an abnormality relating to the information processing device are associated with one another.

In a piece of progression-degree information exemplified in FIG. 11, a detection device ID "D4", a progression degree "S2", and an updated progression degree "S3" are associated with one another. The piece of progression-degree information indicates that, if, when a detection device identified by the detection device ID "D4" detects an abnormality relating to an information processing device, the progression degree relating to the information processing device is the progression degree "S2", the diagnosis device 121 updates the progression degree relating to the information processing device to "S3".

When, as exemplified in FIG. 8, the previous and succeeding progression degrees of each progression degree are uniquely defined, each piece of progression-degree information does not always have to include an updated progression degree and only has to be a piece of information in which a detection device ID and a progression degree relating to an information processing device are associated with each other. For example, it is assumed that the order of progression degrees is an order of S1, S2, S3, S4, and S5. In this case, if the progression degree relating to an information processing device included in a piece of history information generated by a detection device identified by a detection device ID "D2" is the progression degree "S1", the diagnosis device 121 may update the progression degree relating to the information processing device to the progression degree "S2" in accordance with the order.

Figure 12:
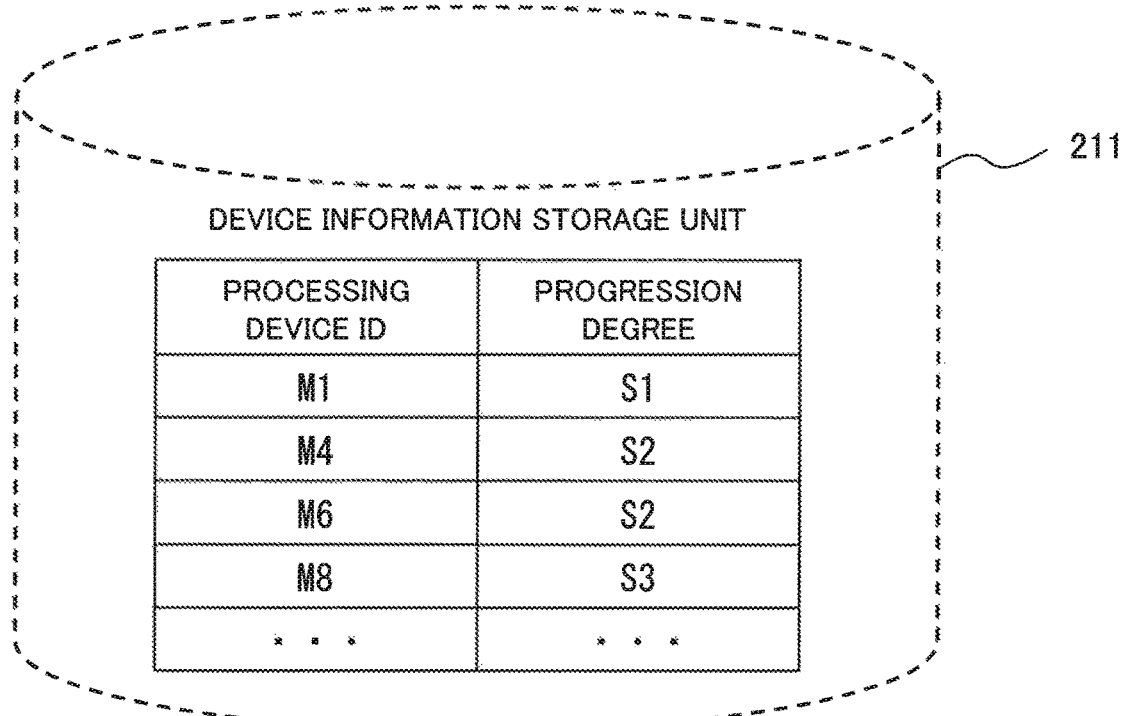
FIG. 12 is a diagram conceptually illustrating an example of device information stored in a device information storage unit.

With reference to FIG. 12, the device information will be described. FIG. 12 is a diagram conceptually illustrating an example of the device information stored in the device information storage unit 211. The device information does not always have to be stored in the device information storage unit 211 and may, for example, be received from an external device (not illustrated) or the like.

The device information is information in each piece of which a processing device ID capable of uniquely identifying an information processing device and a progression degree relating to the information processing device are associated with each other. For example, in a piece of device information exemplified in FIG. 12, a processing device ID "M6" and the progression degree "S2" are associated with each other. The piece of device information indicates that the progression degree relating to an information processing device identified by the processing device ID "M6" is the progression degree "S2".

Note that, for convenience of description, it is assumed that the device information stores only a processing device ID(s) that represent(s) an information processing device(s) for which a progression degree (s) is/are set. However, the device information may include a piece of information in which, when no progression degree is set with respect to an information processing device, a processing device ID of the information processing device and a null value indicating that no progression degree is set are associated with each other. That is, the device information is not limited to the device information exemplified in FIG. 12.

Figure 10:
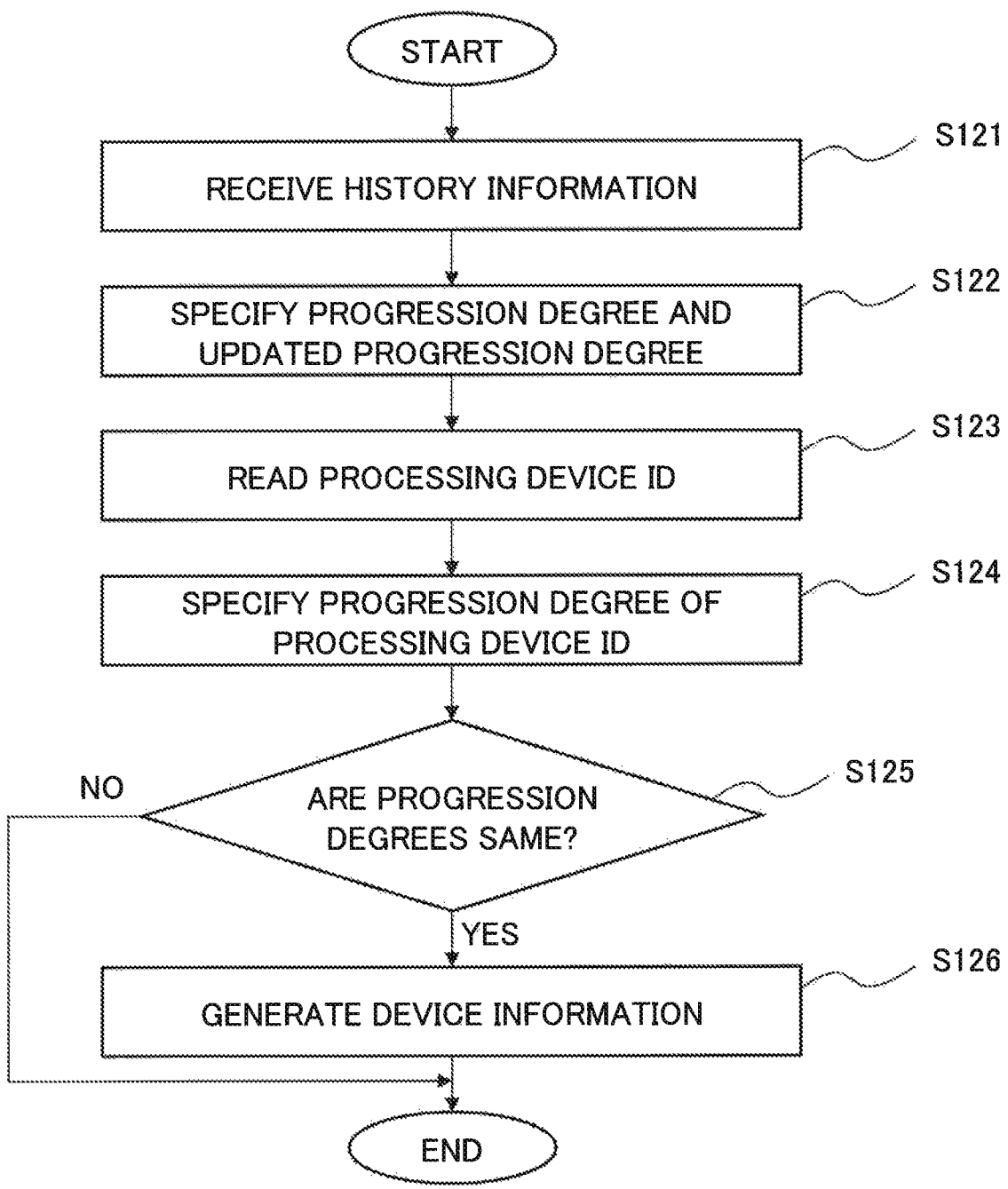
FIG. 10 is a flowchart illustrating a processing flow in the diagnosis device 121 according to the third example embodiment.

Next, with reference to FIG. 10, processing in the diagnosis device 121 according to the third example embodiment of the present invention will be described in detail. FIG. 10 is a flowchart illustrating a processing flow in the diagnosis device 121 according to the third example embodiment.

For convenience of description, it is assumed that a detection device detected an abnormality relating to a first information processing device and output a piece of history information indicating the detected abnormality (for example, one row in FIG. 4) at a first timing. The first timing may be a timing at which a first detection device detected the abnormality or a time at which an agent in the information processing device generated a piece of output information based on which a detection device detected the abnormality. That is, timings (in the above case, the "first timing") are not limited to the above-described example.

The progression-degree specifying unit 122, for example, receives a piece of history information that a detection device output (step S121). As described above, in step S121, the progression-degree specifying unit 122 may, for example, input a piece of history information that a detection device stored in a history information storage unit (not illustrated).

The progression-degree specifying unit 122 specifies a progression degree(s) associated with the detection device ID representing the detection device and an updated progression degree(s) associated with the detection device ID by referring to the progression-degree information stored in the progression-degree information storage unit 212 (step S122).

For example, when receiving a piece of history information that the detection device identified by the detection device ID "D4" output, the progression-degree specifying unit 122 specifies the progression degree "S2" associated with the detection device ID "D4", and the updated progression degree "S3" associated with the detection device ID "D4" in the progression-degree information (exemplified in FIG. 11). Further, when receiving the piece of history information that the detection device identified by the detection device ID "D4" output, the progression-degree specifying unit 122 specifies the progression degree "S3" associated with the detection device ID "D4", and the updated progression degree "S4" associated with the detection device ID "D4" in the progression-degree information (FIG. 11).

Next, the progression-degree determining unit 123 reads a processing device ID from a piece of output information included in the piece of history information (for example, one row in FIG. 4) output by the detection device (step S123). The progression-degree determining unit 123 specifies a progression degree associated with the read processing device ID by referring to the device information stored in the device information storage unit 211 (step S124).

For example, when the piece of output information in the piece of history information (FIG. 4) includes a processing device ID "M4" (that is, the detection device generated a piece of information relating to an information processing device identified by the processing device ID "M4"), the progression-degree determining unit 123 specifies the progression degree "S2" associated with the processing device ID "M4" in the device information (FIG. 12) (step S124).

The progression-degree determining unit 123 determines whether or not the progression degree specified based on the progression-degree information and the progression degree specified based on the device information are the same (step S125). When the progression-degree determining unit 123 determines that the progression degree specified based on the progression-degree information and the progression degree specified based on the device information are the same (YES in step S125), the progression-degree determining unit 123 generates a piece of device information in which the read processing device ID and the updated progression degree are associated with each other (step S126). The progression-degree determining unit 123 stores the generated piece of device information in the device information storage unit 211. When determining that the progression degree specified based on the progression-degree information and the progression degree specified based on the device information are not the same (NO in step S125), the progression-degree determining unit 123 does not perform the processing prescribed in step S126. In other words, the progression-degree determining unit 123 sets the updated progression degree to the progression degree associated with the read processing device ID and, thereby, updates the device information (FIG. 12) stored in the device information storage unit 211.

Figure 13:
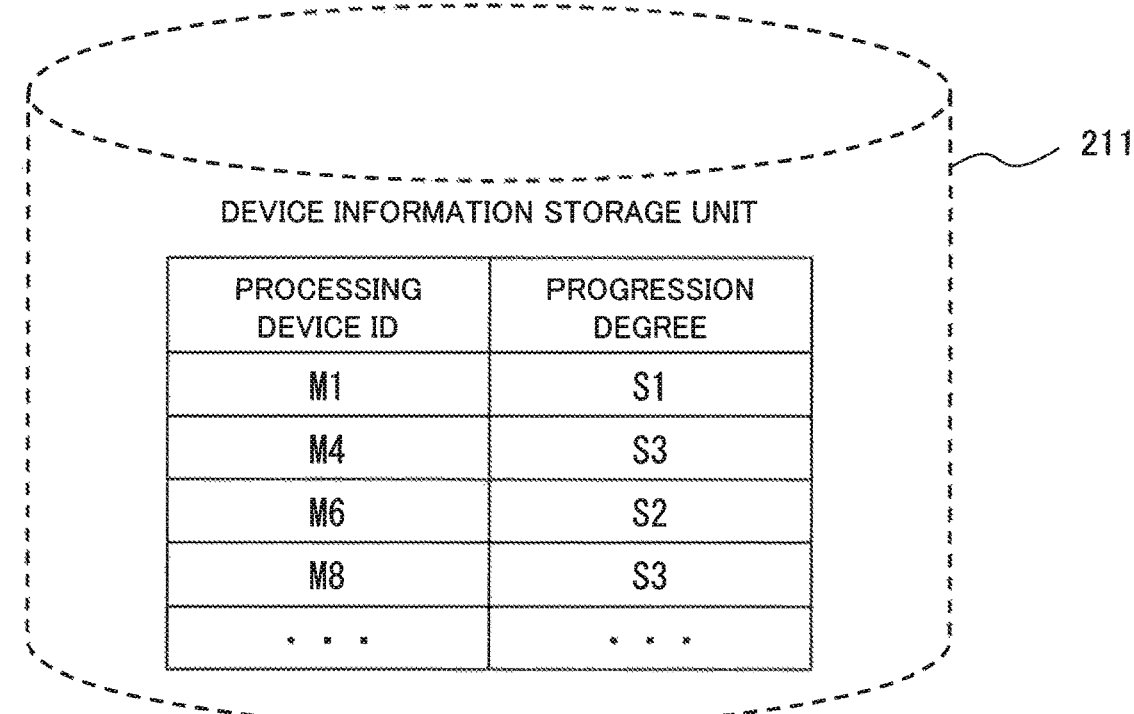
FIG. 13 is a diagram conceptually illustrating an example of updated device information.

For example, the progression-degree determining unit 123 determines whether or not the progression degree "S2" specified based on the progression-degree information and the progression degree "S2" relating to the processing device ID "M4" are the same (step S125). Since the two progression degrees are the same in this case, the progression-degree determining unit 123 generates a piece of device information in which the read processing device ID "M4" and the updated progression degree "S3" are associated with each other (step S126). The progression-degree determining unit 123 stores the generated piece of device information (exemplified in FIG. 13) in the device information storage unit 211. FIG. 13 is a diagram conceptually illustrating an example of the updated device information.

When a plurality of progression degrees are associated with a detection device ID, the progression-degree determining unit 123 performs the processing prescribed in steps S124 to S126 with respect to each progression degree. In addition, when the device information does not include a processing device ID included in a piece of output information, the progression-degree determining unit 123 determines that no progression degree relating to the processing device ID is set (for example, the progression degree is a null value). When the progression degree specified based on the device information is a null value, the progression-degree determining unit 123 determines whether or not the progression degree specified based on the progression-degree information in step S125 is a null value. In other words, the above processing indicates processing in the progression-degree determining unit 123 when no progression degree relating to an information processing device is set.

The diagnosis device 121 may display the device information on a display device (not illustrated). For example, the diagnosis device 121 may display the device information on a display device (not illustrated) in accordance with a display mode in which information processing devices identified by processing device IDs included in the device information are displayed using symbols, such as circles, and, further, the progression degrees associated with the processing device IDs are displayed as labels attached to the symbols. The display mode is not limited to the above-described example.

Next, an advantageous effect relating to the diagnosis device 121 according to the third example embodiment will be described.

The diagnosis device 121 according to the present example embodiment enables a degree of an abnormality having occurred in the information processing system 701 to be detected accurately. The reason for the advantageous effect is because not only does the diagnosis device 121 determine a progression degree merely by combining results of detection by a plurality of detection devices but also the diagnosis device 121 determines a progression degree in accordance with an order of detection device IDs included in determination information in progression-degree information. The reason will be described in detail.

The inventors of the present invention have found that steps used when software having malicious intent, such as malware, attacks an information processing device have some tendency. For example, such steps are steps as described below.

(Step 1) From an information processing device, the software scans ports that other information processing devices have.

(Step 2) The software generates an account with high privileges in an information processing device.

(Step 3) The software alters a program, such as a library, using the generated account.

(Step 4) The software executes an infected program in an information processing device.

(Step 5) The software takes out a file.

Therefore, the diagnosis device 121 according to the present example embodiment may detect a degree of an abnormality having occurred in the information processing system 701 accurately by performing diagnosis relating to an information processing device in a stepwise manner in accordance with the above-described tendency.

Note that, although, in the above-described example, the diagnosis device 121 calculates a progression degree relating to an information processing device when a detection device makes detection, the diagnosis device 121 may calculate a progression degree relating to an information processing device by referring to information generated when a detection device made detection. The diagnosis device 121 is not limited to the above-described example.

Fourth Example Embodiment

Next, a fourth example embodiment of the present invention configured based on the above-described third example embodiment will be described.

In the description hereinafter, description will be made mainly on a characteristic portion according to the present example embodiment, and, in conjunction therewith, by providing the same components as those in the above-described third example embodiment with the same reference symbols, an overlapping description thereof will be omitted.

Figure 14:
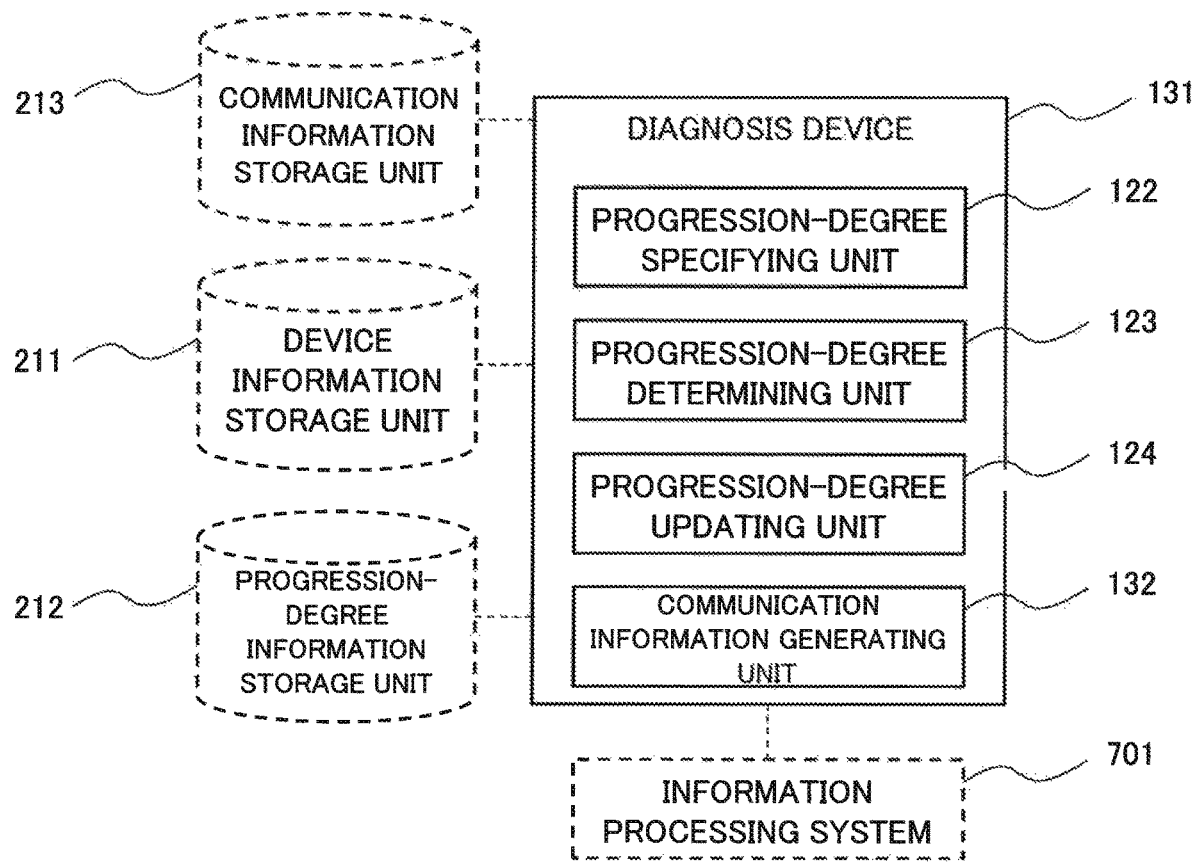
FIG. 14 is a block diagram illustrating a configuration of a diagnosis device according to a fourth example embodiment of the present invention.

With reference to FIG. 14, a configuration of a diagnosis device 131 according to the fourth example embodiment of the present invention will be described in detail. FIG. 14 is a block diagram illustrating a configuration of the diagnosis device 131 according to the fourth example embodiment of the present invention.

The diagnosis device 131 according to the fourth example embodiment includes a progression-degree specifying unit (progression-degree specifier) 122, a progression-degree determining unit (progression-degree determiner) 123, a progression-degree updating unit (progression-degree updater) 124, and a communication information generating unit (communication information generator) 132.

The diagnosis device 131 is capable of referring to progression-degree information (exemplified in FIG. 11) stored in a progression-degree information storage unit 212 and communication information (an example of observation result information) stored in a communication information storage unit 213. The diagnosis device 131 is capable of referring to and updating device information (exemplified in FIG. 12) stored in a device information storage unit 211. Although, in the description hereinafter, for convenience of description, it is assumed that the progression-degree information is stored in the progression-degree information storage unit 212, the progression-degree information may be received from an external device. Similarly, although, for convenience of description, it is assumed that the device information is stored in the device information storage unit 211, the device information may be received from an external device.

In the present example embodiment, for convenience of description, it is assumed that each piece of the device information includes a processing device ID of an information processing device with respect to which a progression degree is set and a progression degree relating to the processing device ID (that is, the device information does not include a null value). Further, it is assumed that the progression degrees are ordered as exemplified in FIG. 8.

Figure 15:
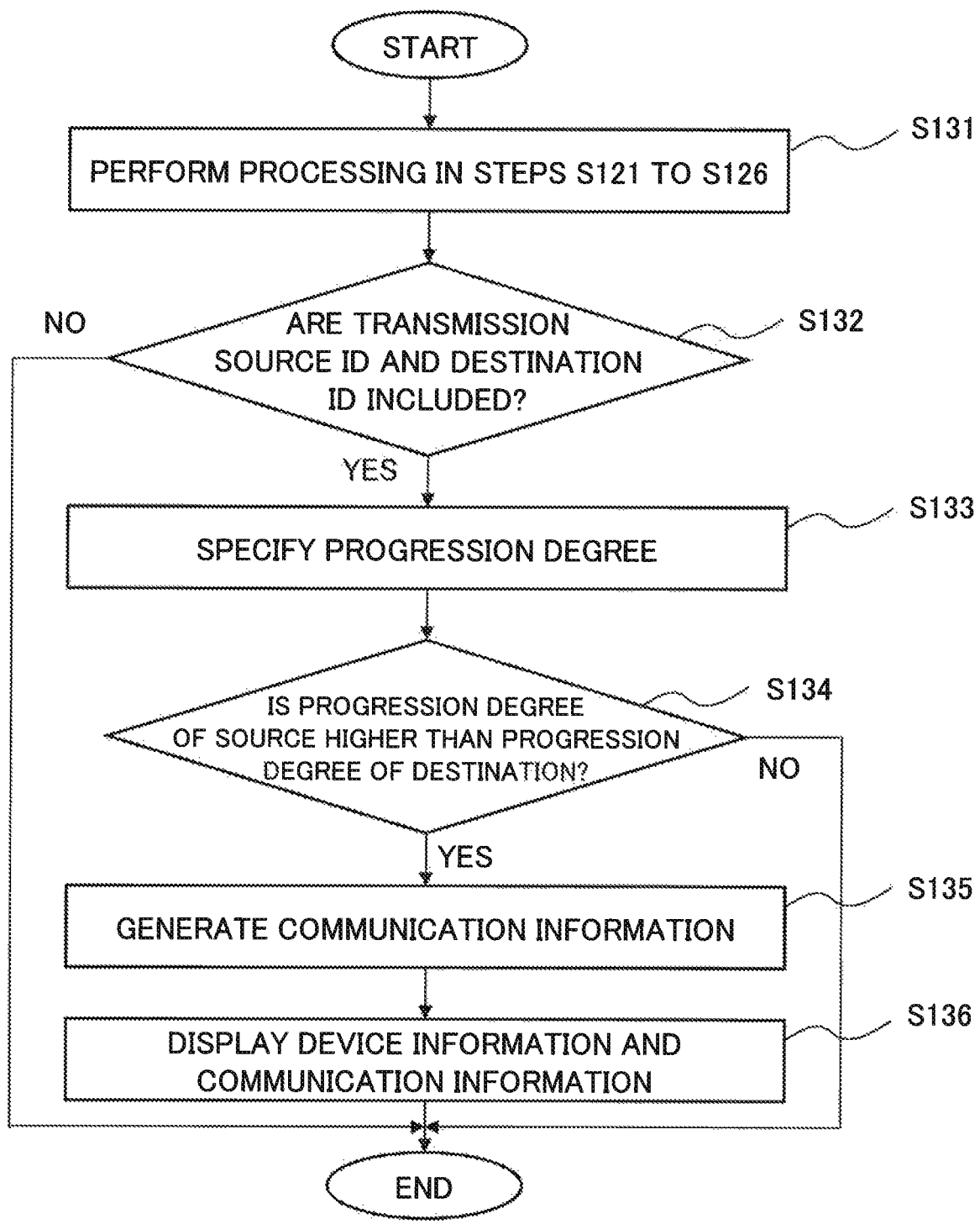
FIG. 15 is a flowchart illustrating a processing flow in a diagnosis device according to a fourth example embodiment.

Next, with reference to FIG. 15, processing in the diagnosis device 131 according to the fourth example embodiment of the present invention will be described in detail. FIG. 15 is a flowchart illustrating a processing flow in the diagnosis device 131 according to the fourth example embodiment.

The progression-degree specifying unit 122, the progression-degree determining unit 123, and the progression-degree updating unit 124 perform processing prescribed in steps S121 to S126 in FIG. 10 (step S131).

The communication information referred by communication information generating unit 132 is information in each piece of which a processing device ID (hereinafter, referred to as a "transmission source ID") that identifies a transmission source (an information processing device) relating to a communication performed in an information processing system 701 and a processing device ID (hereinafter, referred to as a "destination ID") that identifies a transmission destination (an information processing device) relating to the communication are associated with each other. With each piece of communication information, information including a timing of the communication, a size of data transmitted and received in the communication, and the like may be further associated.

The communication information generating unit 132 specifies a transmission source ID and a transmission destination ID by referring to the communication information. The communication information generating unit 132 determines whether or not the transmission source ID and the transmission destination ID are included in the device information (exemplified in FIG. 13) (step S132). When the transmission source ID and the transmission destination ID are included in the device information (YES in step S132), the communication information generating unit 132 specifies a progression degree associated with the transmission source ID (hereinafter, referred to as a "transmission source progression degree") and a progression degree associated with the transmission destination ID (hereinafter, referred to as a "destination progression degree") by referring to the device information (exemplified in FIG. 13) (step S133). That is, the communication information generating unit 132 specifies a progression degree relating to a transmission source and a progression degree relating to a transmission destination in the processing prescribed in step S133.

The communication information generating unit 132 determines whether or not the transmission source progression degree is a progression degree higher (that is, positioned further on the right side in FIG. 8) than the transmission destination progression degree (step S134). When the transmission source progression degree is a progression degree higher than the transmission destination progression degree (YES in step S134), the communication information generating unit 132 generates a piece of communication information in which the transmission source ID and the transmission destination ID are associated with each other (step S135). When the transmission source progression degree is a progression degree lower than the transmission destination progression degree (NO in step S134), the communication information generating unit 132 does not perform the processing prescribed in steps S135 and S136.

The communication information generating unit 132 performs the processing prescribed in steps S132 to S136 with respect to each piece of communication information.

Figure 16:
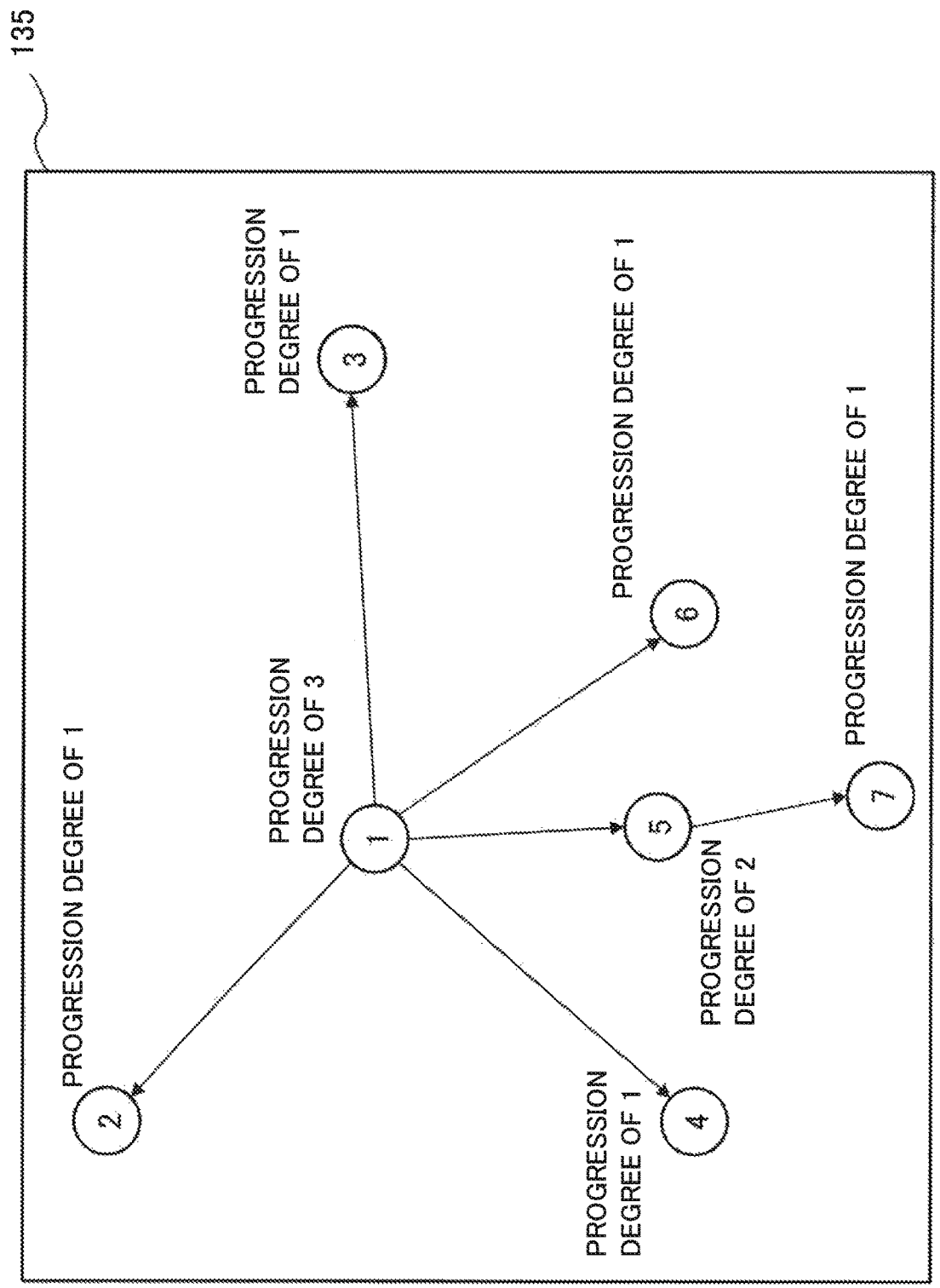
FIG. 16 is a diagram illustrating an example of a display mode.

The communication information generating unit 132 displays the device information and the communication information in accordance with a display mode 135 as exemplified in FIG. 16 (step S136). FIG. 16 is a diagram illustrating an example of a display mode. That is, information processing devices identified by processing device IDs included in the device information are displayed using symbols, such as circles.

Progression degrees associated with the processing device IDs are displayed as labels attached to the symbols, and arrows (arrowed lines) each of which is directed from a symbol representing a transmission source ID included in a piece of generated communication information to a symbol representing a transmission destination ID associated with the transmission source ID are displayed.

That is, with respect to the device information to which progression degrees are set, when data were transmitted from an information processing device having a higher progression degree to an information processing device having a lower progression degree, the communication information generating unit 132 displays symbols representing the two information processing devices and an arrow representing a relevance between the symbols. Further, the communication information generating unit 132, with respect to each symbol, displays a label indicating a progression degree relating to the symbol on a display device (not illustrated).

In the display mode exemplified in FIG. 16, an example in which device information and communication information are described using a graph is illustrated. The graph exemplified in FIG. 16 includes first to seventh nodes and arrows (edges) each of which connects two nodes. Each of the first to seventh nodes represents an information processing device. A progression degree relating to the information processing device is attached (disposed) in the vicinity of the node as a label. For example, the label attached (disposed) in the vicinity of the first node is "progression degree 3", and the label attached (disposed) in the vicinity of the sixth node is "progression degree 1".

Each arrow indicates that a communication was performed in the direction of the arrow and the progression degree is lower in the direction of the arrow (that is, positioned further on the left side in the progression-degree information exemplified in FIG. 8). For example, the arrow directed from the first node to the sixth node indicates that data were transmitted from an information processing device represented by the first node to an information processing device represented by the sixth node and the information processing device represented by the first node has a higher progression degree than the information processing device represented by the sixth node. That is, in the display mode exemplified in FIG. 16, the symbols and arrow illustrate that the information processing device represented by the first node is in a more abnormal state than the information processing device represented by the sixth node. In other words, the arrows represent communications determined to be abnormal among a plurality of abnormal information processing devices.

Next, advantageous effects relating to the diagnosis device 131 according to the fourth example embodiment will be described.

The diagnosis device 131 according to the present example embodiment enables a degree of an abnormality having occurred in the information processing system 701 to be detected accurately. The reason for the advantageous effect is the same as the reason for the advantageous effect obtained by the diagnosis device 121 according to the third example embodiment.

Further, the diagnosis device 131 according to the present example embodiment enables an information processing device that is the source of occurrence of an abnormality having occurred in the information processing system 701 to be specified easily. This is because reference to the communication information generated by the communication information generating unit 132 (or a display displaying the communication information (exemplified in FIG. 16)) enables an information processing device that transmitted data to (an)other information processing device(s) to be specified out of an information processing device(s) having a highest progression degree.

Fifth Example Embodiment

Next, a fifth example embodiment of the present invention that is common to the above-described respective example embodiments will be described.

In the description hereinafter, description will be made mainly on a characteristic portion according to the present example embodiment, and, in conjunction therewith, by providing the same components as those in the above-described respective example embodiments with the same reference symbols, an overlapping description thereof will be omitted.

Figure 17:
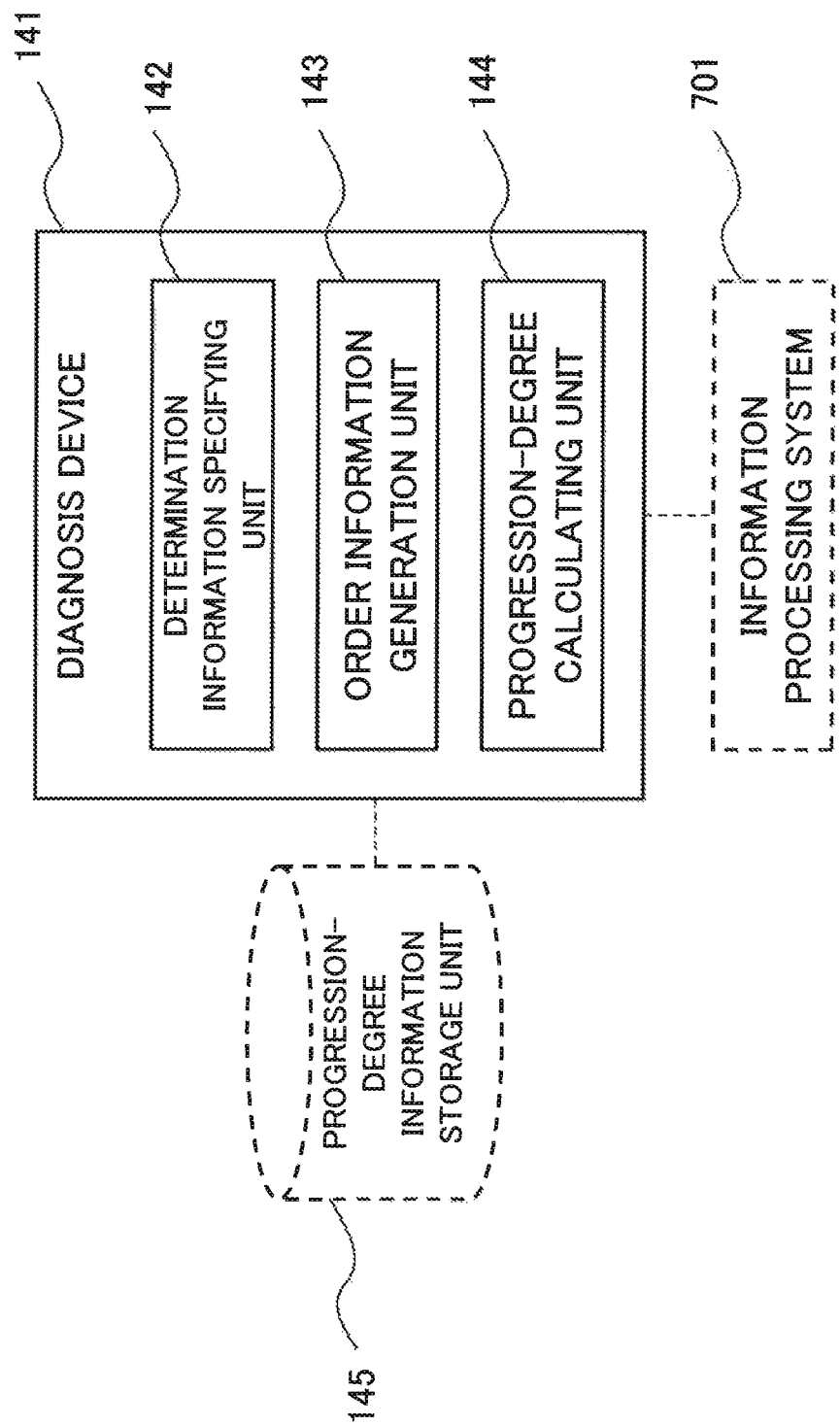
FIG. 17 is a block diagram illustrating a configuration of the diagnosis device 141 according to the fifth example embodiment of the present invention.

With reference to FIG. 17, a configuration of a diagnosis device 141 according to the fifth example embodiment of the present invention will be described in detail. FIG. 17 is a block diagram illustrating a configuration of the diagnosis device 141 according to the fifth example embodiment of the present invention.

The diagnosis device 141 according to the fifth example embodiment includes a determination information specifying unit (determination information specifier) 142, an order information generation unit (order information generator) 143, and a progression-degree calculating unit (progression-degree calculator) 144.

The diagnosis device 141 calculates a progression degree relating to an information processing device, based on progression-degree information (exemplified in FIG. 18 and will be described later) stored in a progression-degree information storage unit 145. The progression-degree information does not always have to be stored in the progression-degree information storage unit 145 and may, for example, be received from an external device (not illustrated) or the like.

A first detection device in an information processing system 701 outputs a piece of output information relating to a first information processing device in the information processing system 701 to the diagnosis device 141 at a first timing.

The determination information specifying unit 142, out of the progression-degree information (FIG. 18, will be described later) indicating an order of detection devices, specifies a position of the first detection device in the order and an order of detection devices that are positioned at or previous to the position in the progression-degree information. For example, when the progression-degree information is progression-degree information exemplified in FIG. 18 and a detection device ID of the first detection device is "D4", the determination information specifying unit 142 specifies "4" that represents a position numbered from the left end as the position of the first detection device and further specifies an order "D2, D1, D3" that is an order of detection devices positioned at or previous to the fourth position.

By referring to history information (exemplified in FIG. 4) including a history(ies) each of which indicates that a detection device in the information processing system 701 output a piece of output information relating to an information processing device at a second timing, the order information generation unit 143 specifies a piece(s) of output information relating to the first information processing device out of a piece(s) of output information output at a second timing(s) at or previous to the first timing. The order information generation unit 143 generates order information representing a mode in which a detection device ID(s) of a detection device(s) that output the specified piece(s) of output information is/are arranged in the order of the second timing(s).

The progression-degree calculating unit 144 determines whether or not a detection device ID(s) in the order information generated by the order information generation unit 143 occur(s) in accordance with the order (for example, the order "D2, D1, D3") specified by the determination information specifying unit 142. When determining that a detection device ID(s) in the order information generated by the order information generation unit 143 occur(s) in accordance with the order specified by the determination information specifying unit 142, the progression-degree calculating unit 144 calculates a progression degree that represents a degree of an abnormality with respect to the first information processing device according to the position (for example, "4") specified by the determination information specifying unit 142. For example, when the position is "4", the progression-degree calculating unit 144 calculates the progression degree to be "S4".

Figure 18:
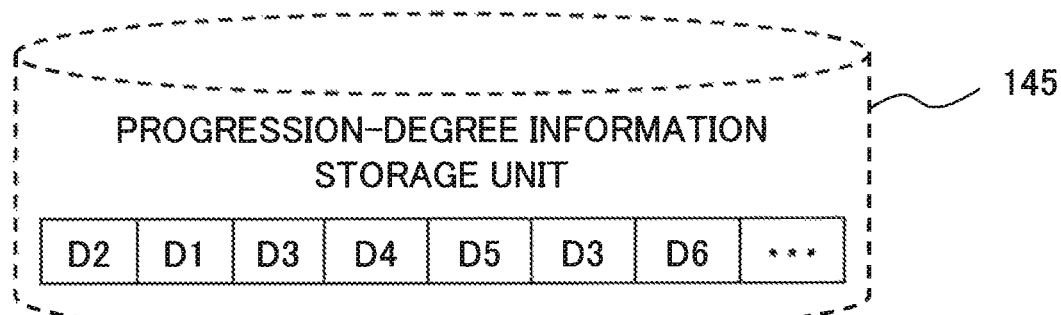
FIG. 18 is a diagram conceptually illustrating an example of progression-degree information stored in a progression-degree information storage unit.

With reference to FIG. 18, the progression-degree information will be described in detail. FIG. 18 is a diagram conceptually illustrating an example of the progression-degree information stored in the progression-degree information storage unit 145. The progression-degree information does not always have to be stored in the progression-degree information storage unit 145 and may, for example, be received from an external device (not illustrated) or the like.

The progression-degree information exemplified in FIG. 18 is information including a plurality of detection device IDs representing detection devices. For example, the progression-degree information includes detection device IDs, such as the detection device ID "D2", the detection device ID "D1", the detection device ID "D3", the detection device ID "D4", and a detection device ID "D5". A detection device identified by each detection device ID detects an abnormality occurring in an information processing device in the information processing system 701 and generates a piece of output information relating to the detected abnormality.

Next, advantageous effects relating to the diagnosis device 141 according to the fifth example embodiment will be described.

The diagnosis device 141 according to the present example embodiment enables a degree of an abnormality having occurred in the information processing system 701 to be detected accurately. The reason for the advantageous effect is because not only does the diagnosis device 141 determine a progression degree merely by combining results of detection by a plurality of detection devices but also, when detection is made in accordance with an order of detection device IDs included in progression-degree information, the diagnosis device 141 determines a progression degree based on the order.

Sixth Example Embodiment

Next, a sixth example embodiment of the present invention that is common to the above-described respective example embodiments will be described.

In the description hereinafter, description will be made mainly on a characteristic portion according to the present example embodiment, and, in conjunction therewith, by providing the same components as those in the above-described respective example embodiments with the same reference symbols, an overlapping description thereof will be omitted.

Figure 19:
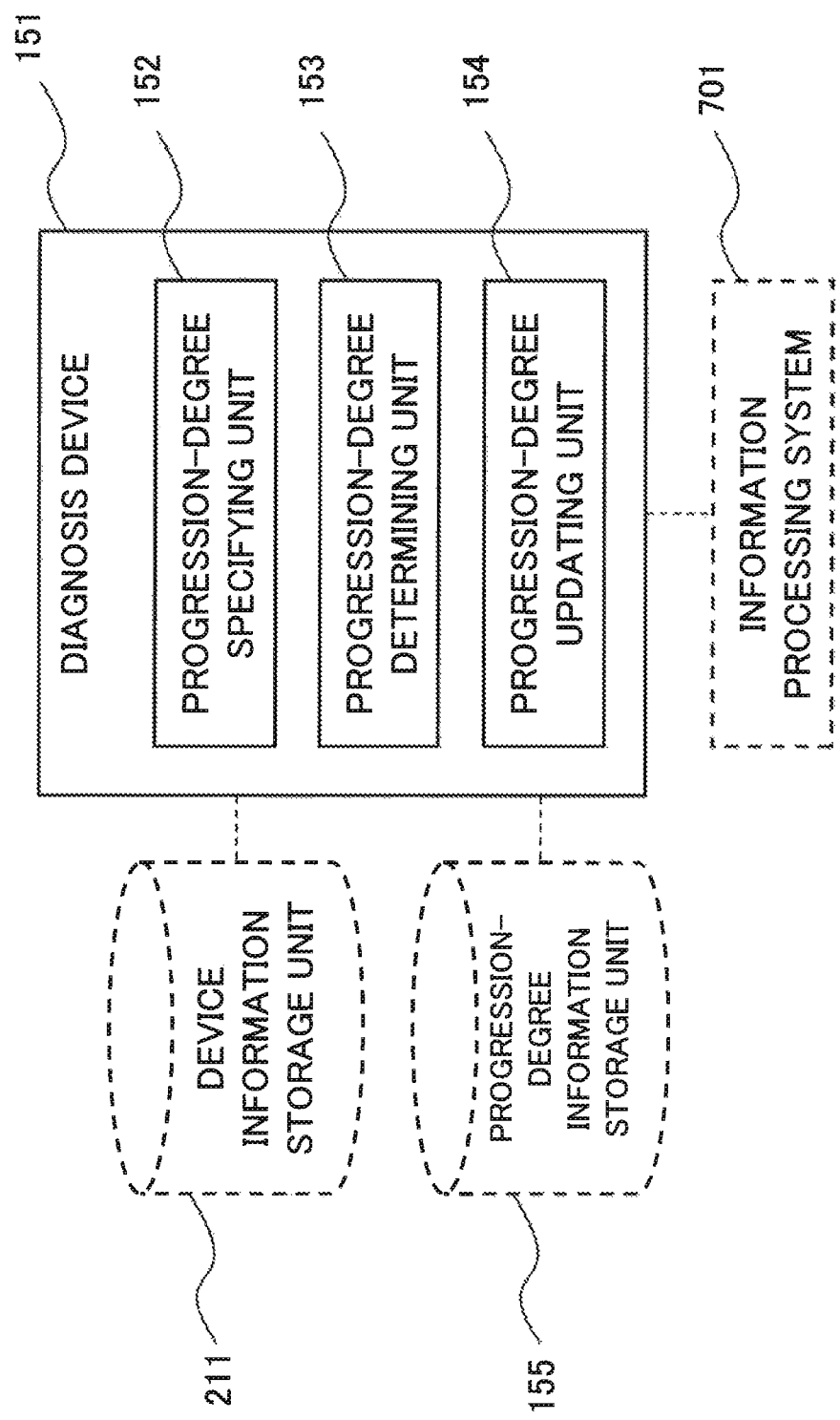
FIG. 19 is a block diagram illustrating a configuration of a diagnosis device according to a sixth example embodiment of the present invention.

With reference to FIG. 19, a configuration of a diagnosis device 151 according to the sixth example embodiment of the present invention will be described in detail. FIG. 19 is a block diagram illustrating a configuration of the diagnosis device 151 according to the sixth example embodiment of the present invention.

The diagnosis device 151 according to the sixth example embodiment includes a progression-degree specifying unit (progression-degree specifier) 152, a progression-degree determining unit (progression-degree determiner) 153, and a progression-degree updating unit (progression-degree updater) 154.

The diagnosis device 151 is capable of referring to progression-degree information (exemplified in FIG. 20 and will be described later) that is stored in a progression-degree information storage unit 155. The diagnosis device 151 is capable of referring to and updating device information (exemplified in FIG. 12) stored in a device information storage unit 211. Although, in the description hereinafter, for convenience of description, it is assumed that the progression-degree information is stored in the progression-degree information storage unit 155, the progression-degree information may be received from an external device. Similarly, although, for convenience of description, it is assumed that the device information is stored in the device information storage unit 211, the device information may be received from an external device.

A first detection device in an information processing system 701 outputs a piece of output information relating to a first information processing device in the information processing system 701 at a first timing.

The progression-degree specifying unit 152 specifies a progression degree relating to the first information processing device by referring to the device information (exemplified in FIG. 12) each piece of which, with respect to an information processing device in the information processing system 701, indicates a progression degree that represents a degree to which the information processing device is abnormal.

The progression-degree determining unit 153 determines whether or not the progression-degree information (exemplified in FIG. 20 and will be described later) in each piece of which a detection device ID capable of identifying a detection device and a progression degree are associated with each other includes a piece of information in which a detection device ID of the first detection device and the specified progression degree are associated with each other.

For example, when the detection device ID of the first detection device is "D3" and the progression degree relating to the first information processing device is "S1", the progression-degree determining unit 153 determines whether or not the progression-degree information includes a piece of information in which the detection device ID "D3" and the progression degree "S1" are associated with each other.

When the piece of information in which the detection device ID of the first detection device and the specified progression degree are associated with each other is included in the progression-degree information, the progression-degree updating unit 154 calculates a progression degree relating to the first information processing device according to the specified progression degree. For example, when the specified progression degree is "S1", the progression-degree updating unit 154 calculates a progression degree "S2" that is one level higher than the progression degree "S1" as a progression degree relating to the first information processing device.

Figure 20:
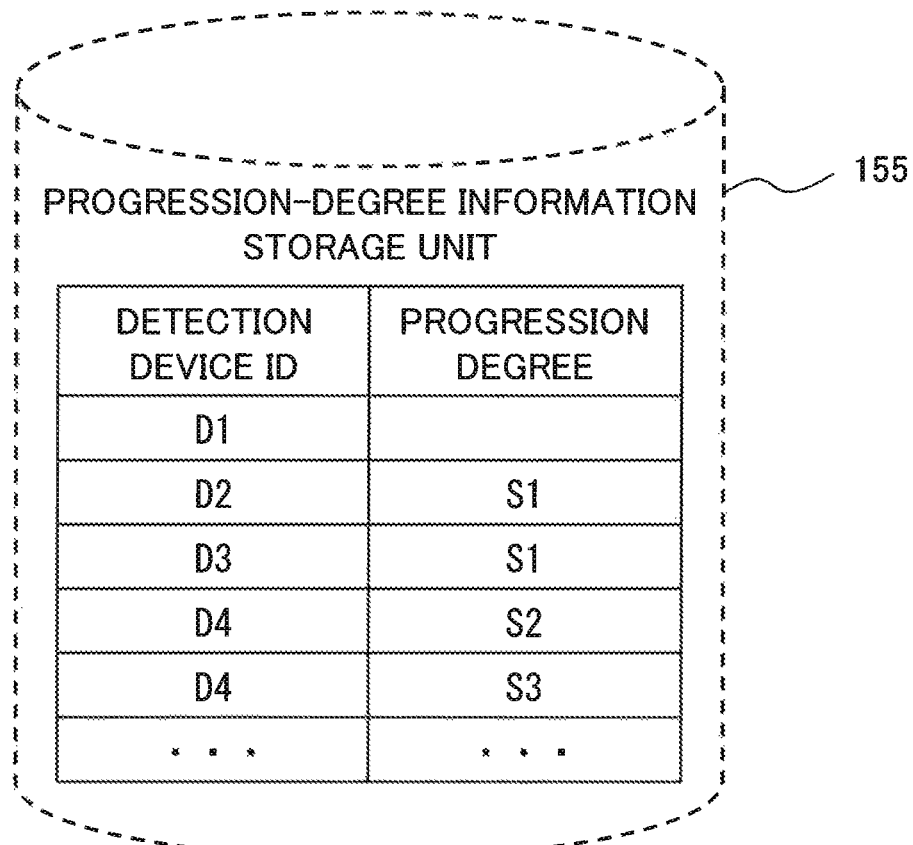
FIG. 20 is a diagram conceptually illustrating an example of progression-degree information stored in a progression-degree information storage unit.

With reference to FIG. 20, the progression-degree information will be described. FIG. 20 is a diagram conceptually illustrating an example of the progression-degree information stored in the progression-degree information storage unit 155. The progression-degree information does not always have to be stored in the progression-degree information storage unit 155 and may, for example, be received from an external device (not illustrated) or the like.

The progression-degree information is information in each piece of which a detection device ID of a detection device and a progression degree relating to an information processing device are associated with each other.

In the progression-degree information exemplified in FIG. 20, a detection device ID "D4" and the progression degree "S2" are associated with each other. The piece of progression-degree information indicates that, if, when a detection device identified by the detection device ID "D4" detects an abnormality relating to an information processing device, the progression degree relating to the information processing device is the progression degree "S2", the diagnosis device 151 updates the progression degree relating to the information processing device.

Next, an advantageous effect relating to the diagnosis device 151 according to the sixth example embodiment will be described.

The diagnosis device 151 according to the present example embodiment enables a degree of an abnormality having occurred in the information processing system 701 to be detected accurately. The reason for the advantageous effect is because not only does the diagnosis device 151 determine a progression degree merely by combining results of detection by a plurality of detection devices but also, when detection is made in accordance with an order of detection device IDs included in determination information in progression-degree information, the diagnosis device 151 determines a progression degree, based on the order.

(Hardware Configuration Example)

A configuration example of hardware resources that realize a diagnosis device according to each example embodiment of the present invention will be described. However, the diagnosis device may be realized using physically or functionally at least two calculation processing devices. Further, the diagnosis device may be realized as a dedicated apparatus.

FIG. 21 is a block diagram schematically illustrating a hardware configuration of a calculation processing device capable of realizing the diagnosis device according to the each example embodiments of the present invention. A calculation processing device 20 includes a central processing unit (CPU) 21, a memory 22, a disk 23, a non-transitory recording medium 24, and a communication interface (hereinafter, expressed as. "communication I/F") 27. The calculation processing device 20 may connect an input device 25 and an output device 26. The calculation processing device 20 can execute transmission/reception of information to/from another calculation processing device and a communication apparatus via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored by the disk 23 when executing the program and executes arithmetic processing. The CPU 21 reads data necessary for program execution from the memory 22. When display is needed, the CPU 21 displays an output result on the output device 26. When a program is input from the outside, the CPU 21 reads the program from the input device 25. The CPU 21 interprets and executes a software diagnosis program (FIG. 3, FIG. 7, FIG. 10, or FIG. 15) present on the memory 22 corresponding to a function (processing) indicated by each unit illustrated in FIG. 1, FIG. 2, FIG. 6, FIG. 9, FIG. 14, FIG. 17, or FIG. 19 described above. The CPU 21 sequentially executes the processing described in each example embodiment of the present invention.

In other words, in such a case, it is conceivable that the present invention can also be made using the diagnosis program. Further, it is conceivable that the present invention can also be made using a computer-readable, non-transitory recording medium storing the diagnosis program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

A part or all of the above-described example embodiments can be described as the following supplementary notes. However, the present invention having been exemplarily described using the above-described exemplary embodiments is not limited to the following.

(Supplementary Note 1)

A diagnosis device comprising:

progression-degree specifying means for specifying a progression degree relating to a first information processing device for output information output by a first detection device at a first timing with respect to the first information processing device, based on device information indicates a progression degree that represents a degree to which the information processing device is abnormal with respect to the information processing device;

progression-degree determining means for determining whether or not information in which a first detection device identifier of the first detection device and the progression degree specified by the progression-degree specifying means are associated with each other is included in progression-degree information in which a detection device identifier capable of identifying a detection device and the progression degree are associated with each other; and progression-degree updating means for calculating the progression degree relating to the first information processing device according to the specified progression degree when the information is determined to be included in the progression-degree information.

(Supplementary Note 2)

The diagnosis device according to claim 1 further comprising device information storage means that is capable of storing the device information, wherein the device information is information in which a device identifier capable of identifying information processing device and the progression degree relating to the information processing device are associated with each other, and the progression-degree specifying means specifies the progression degree associated with a first processing device identifier of the first information processing device, based on the device information stored in the device information storage means.

(Supplementary Note 3)

The diagnosis device according to claim 1 or 2 further comprising progression-degree information storage means for storing the progression-degree information, wherein the progression-degree information is information in which the detection device identifier, the progression degree, and a progression degree succeeding the progression degree are associated with one another, and the progression-degree determining means determines whether or not information associated with the first detection device identifier and the specified progression degree is included in the progression-degree information stored in the progression-degree information storage means.

(Supplementary Note 4)

The diagnosis device according to claim 3, wherein the progression-degree updating means specifies the succeeding progression degree associated with the first detection device identifier and the specified progression degree, based on the progression-degree information, and calculates the progression degree relating to the first information processing device by the specified succeeding progression degree.

(Supplementary Note 5)

The diagnosis device according to any one of claims 1 to 4, wherein the progression-degree updating means updates the progression-degree information relating to the first information processing device in the device information, by using information in which the first processing device identifier and the progression degree relating to the first information processing device are associated with each other.

(Supplementary Note 6)

The diagnosis device according to claim 5 further comprising communication information generating means for generating, based on the progression-degree information, communication information in which a second information processing device identifier and a third information processing device identifier are associated with each other when a second information processing device identified by the second processing device identifier included in the progression-degree information transmits data to a third information processing device identified by the third processing device identifier included in the progression-degree information and, further, the progression degree relating to the second information processing device is a progression degree higher than the progression degree relating to the third information processing device.

(Supplementary Note 7)

The diagnosis device according to claim 6, wherein the communication information generating means determines whether or not communication history information in which a fourth processing device identifier representing a transmission source and a fifth processing device identifier representing a transmission destination includes information in which the second processing device identifier and the third processing device identifier are associated with each other, specifies the progression degree associated with the second processing device identifier and the progression degree associated with the third processing device identifier based on the progression-degree information when the communication history information includes the information, and compares the specified two progression degrees with each other.

(Supplementary Note 8)

The diagnosis device according to claim 6 or 7, wherein the communication information generating means displays a second symbol representing the second processing device identifier in the communication information, a third symbol representing the third processing device identifier associated with the second processing device identifier, and an arrow directed from the second symbol to the third symbol on a display device.

(Supplementary Note 9)

The diagnosis device according to claim 8, wherein the communication information generating means performs display on the display device in accordance with a mode in which the progression degree relating to the second information processing device is disposed in a vicinity of the second symbol and a progression degree relating to the third information processing device is disposed in a vicinity of the third symbol.

(Supplementary Note 10)

A diagnosis device method:

specifying a progression degree relating to a first information processing device for output information output by a first detection device at a first timing with respect to the first information processing device, based on device information indicates a progression degree that represents a degree to which the information processing device is abnormal with respect to the information processing device;

determining whether or not information in which a first detection device identifier of the first detection device and the specified progression degree are associated with each other is included in progression-degree information in which a detection device identifier capable of identifying a detection device and the progression degree are associated with each other; and calculating the progression degree relating to the first information processing device according to the specified progression degree when the information is determined to be included in the progression-degree information.

(Supplementary Note 11)

A recording medium storing a diagnosis program recorded therein, the program making a computer achieve:

a progression-degree specifying function for specifying a progression degree relating to a first information processing device for output information output by a first detection device at a first timing with respect to the first information processing device, based on device information indicates a progression degree that represents a degree to which the information processing device is abnormal with respect to the information processing device;

a progression-degree determining function for determining whether or not information in which a first detection device identifier of the first detection device and the progression degree specified by the progression-degree specifying function are associated with each other is included in progression-degree information in which a detection device identifier capable of identifying a detection device and the progression degree are associated with each other; and a progression-degree updating function for calculating the progression degree relating to the first information processing device according to the specified progression degree when the information is determined to be included in the progression-degree information.

This application is based upon and claims the benefit of priority from Japanese patent application No. 2015-239829, filed on Dec. 9, 2015, the disclosure of which is incorporated herein in its entirety.

REFERENCE SIGNS LIST 101 diagnosis device
102 determination information specifying unit
103 order information generation unit
104 progression-degree calculating unit
201 progression-degree information storage unit
202 history information storage unit
701 information processing system
702 observation device
703 detection device
704 detection device
705 information processing device
706 information processing device
707 agent
708 agent
709 history information storage unit
111 diagnosis device
112 determination information specifying unit
113 order information generation unit
114 progression-degree calculating unit
115 progression-degree information storage unit
121 diagnosis device
122 progression-degree specifying unit
123 progression-degree determining unit
124 progression-degree updating unit
211 device information storage unit
212 progression-degree information storage unit
131 diagnosis device
132 communication information generating unit
213 communication information storage unit
151 diagnosis device
152 progression-degree specifying unit
153 progression-degree determining unit
154 progression-degree updating unit
155 progression-degree information storage unit
20 calculation processing device
21 CPU
22 memory
23 disk
24 non-transitory recording medium
25 input device
26 output device
27 communication IF

What is claimed is:

1. A diagnosis device comprising:
a progression-degree specifier configured to specify a progression degree relating to a first information processing device for output information output by a first detection device at a first timing with respect to the first information processing device, based on device information indicates a progression degree that represents a degree to which the information processing device is abnormal with respect to the information processing device;

a progression-degree determiner configured to determine whether or not information in which a first detection device identifier of the first detection device and the progression degree specified by the progression-degree specifier are associated with each other is included in progression-degree information in which a detection device identifier capable of identifying a detection device and the progression degree are associated with each other;

a progression-degree updater configured to calculate the progression degree relating to the first information processing device according to the specified progression degree when the information is determined to be included in the progression-degree information; and a progression-degree information storage configured to store the progression-degree information; wherein the progression-degree information is information in which the detection device identifier, the progression degree, and a progression degree succeeding the progression degree are associated with one another, the progression-degree determiner determines whether or not information associated with the first detection device identifier and the specified progression degree is included in the progression-degree information stored in the progression-degree information storage, and the progression-degree updater specifies the succeeding progression degree associated with the first detection device identifier and the specified progression degree, based on the progression-degree information, and calculates the progression degree relating to the first information processing device by the specified succeeding progression degree.

2. The diagnosis device according to claim 1 further comprising
device information storage that is capable of storing the device information, wherein
the device information is information in which a device identifier capable of identifying information processing device and the progression degree relating to the information processing device are associated with each other, and
the progression-degree specifier specifies the progression degree associated with a first processing device identifier of the first information processing device, based on the device information stored in the device information storage.

3. The diagnosis device according to claim 1, wherein
the progression-degree updater updates the progression-degree information relating to the first information processing device in the device information, by using information in which the first processing device identifier and the progression degree relating to the first information processing device are associated with each other.

4. The diagnosis device according to claim 3 further comprising
a communication information generator configured to generate, based on the progression-degree information, communication information in which a second information processing device identifier and a third information processing device are associated with each other when a second information processing device identified by the second processing device identifier included in the progression-degree information transmits data to a third information processing device identified by the third processing device identifier included in the progression-degree information and, further, the progression degree relating to the second information processing device is a progression degree higher than the progression degree relating to the third information processing device.

5. The diagnosis device according to claim 4, wherein
the communication information generator determines whether or not communication history information in which a fourth processing device identifier representing a transmission source and a fifth processing device identifier representing a transmission destination includes information in which the second processing device identifier and the third processing device identifier are associated with each other, specifies the progression degree associated with the second processing device identifier and the progression degree associated with the third processing device identifier based on the progression-degree information when the communication history information includes the information, and compares the specified two progression degrees with each other.

6. The diagnosis device according to claim 4, wherein the communication information generator displays a second symbol representing the second processing device identifier in the communication information, a third symbol representing the third processing device identifier associated with the second processing device identifier, and an arrow directed from the second symbol to the third symbol on a display device.

7. The diagnosis device according to claim 6, wherein
the communication information generator performs display on the display device in accordance with a mode in which the progression degree relating to the second information processing device is disposed in a vicinity of the second symbol and a progression degree relating to the third information processing device is disposed in a vicinity of the third symbol.

8. A diagnosis method comprising:
specifying a progression degree relating to a first information processing device for output information output by a first detection device at a first timing with respect to the first information processing device, based on device information indicates a progression degree that represents a degree to which the information processing device is abnormal with respect to the information processing device;
determining whether or not information in which a first detection device identifier of the first detection device and the specified progression degree are associated with each other is included in progression-degree information in which a detection device identifier capable of identifying a detection device and the progression degree are associated with each other;
calculating the progression degree relating to the first information processing device according to the specified progression degree when the information is determined to be included in the progression-degree information; and
storing the progression-degree information in a storage; wherein
the progression-degree information is information in which the detection device identifier, the progression degree, and a progression degree succeeding the progression degree are associated with one another,
the determining determines whether or not information associated with the first detection device identifier and the specified progression degree is included in the progression-degree information stored in the storage, and
the calculating specifies the succeeding progression degree associated with the first detection device identifier and the specified progression degree, based on the progression-degree information, and calculates the progression degree relating to the first information processing device by the specified succeeding progression degree.

9. A non-transitory recording medium storing a diagnosis program recorded therein, the program making a computer achieve:
a progression-degree specifying function configured to specify a progression degree relating to a first information processing device for output information output by a first detection device at a first timing with respect to the first information processing device, based on device information indicates a progression degree that represents a degree to which the information processing device is abnormal with respect to the information processing device;
a progression-degree determining function configured to determine whether or not information in which a first detection device identifier of the first detection device and the progression degree specified by the progression-degree specifying function are associated with each other is included in progression-degree information in which a detection device identifier capable of identifying a detection device and the progression degree are associated with each other;
a progression-degree updating function configured to calculate the progression degree relating to the first information processing device according to the specified progression degree when the information is determined to be included in the progression-degree information; and
a progression-degree information storage function configured to store the progression-degree information in a storage; wherein
the progression-degree information is information in which the detection device identifier, the progression degree, and a progression degree succeeding the progression degree are associated with one another,
the progression-degree determining function determines whether or not information associated with the first detection device identifier and the specified progression degree is included in the progression-degree information stored in the storage, and
the progression-degree updating function specifies the succeeding progression degree associated with the first detection device identifier and the specified progression degree, based on the progression-degree information, and calculates the progression degree relating to the first information processing device by the specified succeeding progression degree.

\* \* \* \* \*